United States Patent
Zhang et al.

(10) Patent No.: US 9,474,041 B1
(45) Date of Patent: *Oct. 18, 2016

(54) METHOD AND APPARATUS FOR DETERMINING A LOCATION OF A NETWORK DEVICE IN A WIRELESS NETWORK

(71) Applicant: Marvell International Ltd., Hamilton (BM)

(72) Inventors: Hongyuan Zhang, Fremont, CA (US); Liwen Chu, San Ramon, CA (US); Sudhir Srinivasa, Campbell, CA (US)

(73) Assignee: Marvell International LTD., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/969,503

(22) Filed: Dec. 15, 2015

Related U.S. Application Data

(63) Continuation of application No. 14/509,800, filed on Oct. 8, 2014, now Pat. No. 9,237,546.

(60) Provisional application No. 61/897,474, filed on Oct. 30, 2013.

(51) Int. Cl.
*H04W 24/00* (2009.01)
*H04W 64/00* (2009.01)
*H04W 4/02* (2009.01)

(52) U.S. Cl.
CPC .............. *H04W 64/00* (2013.01); *H04W 4/02* (2013.01)

(58) Field of Classification Search
None
See application file for complete search history.

(56) References Cited

U.S. PATENT DOCUMENTS

| | | |
|---|---|---|
| 8,233,457 B1 | 7/2012 | Chen et al. |
| 9,237,546 B1 * | 1/2016 | Zhang .................. H04W 64/00 |
| 2015/0094103 A1 | 4/2015 | Wang et al. |

OTHER PUBLICATIONS

IEEE 802.16; IEEE Standard for Local and Metropolitan area networks; Part 16: Air Interface for Broadband Wireless Access Systems; IEEE Computer Society and IEEE Microwave Theory and Techniques Society; May 29, 2009; 2082 Pages.

IEEE 802.220; IEEE Standard for Local and metropolitan area networks; Part 20: Air Interface for Mobile Broadband Wireless Access Systems Supporting Vehicular Mobility—Physical and Media Access Control Layer Specification; Aug. 29, 2008; 1053 Pages.

IEEE P802.11-REVmc/D2.9; Draft Standard for Information technology—Telecommunications and information exchange between systems Local and metropolitan area networks—Specific requirements; Part 11: Wireless LAN Medium Access Control (MAC) and Physical Layer (PHY) Specifications; May 2014; 3755 Pages.

(Continued)

*Primary Examiner* — Erika Washington

(57) ABSTRACT

A first access point including a receiver, a transmitter, a feedback module, and a location determining module. The receiver receives a first frame from a client station. The transmitter transmits a second frame to the client station. The first and second frames are also received by second and third devices, which are located at predetermined locations. The feedback module receives a first feedback from the client station including times of departure and arrival of the first and second frames at the client station, and a second feedback from the second and third devices including times of arrival of the first and second frames at the second device and the third device. The location determining module determines a location of the client station based on the times of arrival and departure of the first and second frames at the first access point, the first and second feedbacks, and the predetermined locations.

22 Claims, 21 Drawing Sheets

(56) References Cited

OTHER PUBLICATIONS

IEEE P802.11ac/D2.1; Draft Standard for Information Technology—Telecommunications and information exchange between systems—Local and metropolitan area networks—Specific Requirements; Part 11: Wireless LAN Medium Access Control (MAC) and Physical Layer (PHY) specifications; Amendment 4: Enhancements for Very High Throughput for Operation in Bands below 6 GHz; Mar. 2012; 363 Pages.

IEEE P802.11ad/D5.0; Draft Standard for Information Technology—Telecommunications and Information Exchange Between Systems—Local and Metropolitan Area Networks—Specific Requirements; Part 11: Wireless LAN Medium Access Control (MAC) and Physical Layer (PHY) Specifications; Amendment 3: Enhancements for Very High Throughput in the 60 GHz Band; Sep. 2011; 601 Pages.

IEEE P802.11ah—yy/xxxxr06: Park, Minyoung; Draft IEEE P802.11 Wireless LANs; Proposed Specification Framework for TGah; Mar. 2012; 13 Pages.

IEEE P802.11v/D14.0—Draft Standard for Information Technology—Telecommunications and information exchange between systems—Local and metropolitan area networks—Specific Requirements—Part 11: Wireless LAN Medium Access Control (MAC) and Physical Layer (PHY) specifications; Amendment 8: IEEE 802.11 Wireless Network Management; Aug. 2010; 426 Pages.

IEEE Std. 802.11—2012; IEEE Standard for information technology—Telecommunications and information exchange between systems Local and metropolitan area networks—Specific requirements; Part 11: Wireless LAN Medium Access Control (MAC) and Physical Layer (PHY) Specifications; Mar. 29, 2012; 2793 Pages.

\* cited by examiner

METHOD AND APPARATUS FOR DETERMINING A LOCATION OF A NETWORK DEVICE IN A WIRELESS NETWORK

CROSS-REFERENCE TO RELATED APPLICATIONS

This application is a continuation of U.S. patent application Ser. No. 14/509,800 (now U.S. Pat. No. 9,237,546), filed on Oct. 8, 2014, which claims the benefit of U.S. Provisional Application No. 61/897,474, filed on Oct. 30, 2013. The entire disclosures of the applications referenced above are incorporated herein by reference.

FIELD

The present disclosure relates generally to wireless networks and more particularly to systems and methods for determining location of a network device in wireless networks.

BACKGROUND

The Institute of Electrical and Electronics Engineers (IEEE) has developed several 802.1X specifications that define communication protocols used by network devices operating in wireless local area networks (WLAN5). For example, the communication protocols include authentication schemes that can be used to securely exchange data between the network devices. The communication protocols include power-saving strategies that can be used to save power in the network devices. The communication protocols include synchronization schemes to synchronize clocks of the network devices, and so on.

SUMMARY

A system comprises a first access point including a transmitter, a receiver, a timing module, a feedback module, and a location determining module. The transmitter is configured to transmit a first frame from the first access point on a predetermined frequency channel of a wireless network during a predetermined time slot to determine a location of a first device in the wireless network. The first frame is received by the first device, a second device, and a third device in the wireless network. The first access point, the second device, and the third device (i) are separated from each other by predetermined distances, (ii) are located at predetermined locations in the wireless network, and (iii) are configured to communicate on the predetermined frequency channel during the predetermined time slot. The receiver is configured to receive, in response to the transmitter transmitting the first frame, a second frame at the first access point from the first device on the predetermined frequency channel during the predetermined time slot. The second frame is also received by the second device and the third device. The timing module is configured to generate timing information including (i) a time of departure of the first frame from the first access point, and (ii) a time of arrival of the second frame at the first access point. The feedback module is configured to receive feedback information at the first access point from the second device and the third device including times of arrival of the first frame and the second frame at the second device and the third device. The location determining module is configured to determine, at the first access point, the location of the first device based on (i) the timing information; (ii) the feedback information; and (iii) the predetermined locations of the first access point, the second device, and the third device.

In other features, the system further comprises a time difference determining module and a distance difference determining module. The time difference determining module is configured to determine, based on the timing information, the feedback information, and the predetermined distances, a first time difference of arrival between times of arrival of the second frame at the first access point and at the second device, and a second time difference of arrival between times of arrival of the second frame at the first access point and at the third device. The distance difference determining module is configured to determine, at the first access point, based on the first time difference of arrival and the second time difference of arrival, differences between distances from the first device to the first access point, the second device, and the third device. The location determining module is configured to determine, at the first access point, the location of the first device based on (i) the differences between distances from the first device to the first access point, the second device, and the third device; (ii) the predetermined distances between the first access point, the second device, and the third device; and (iii) the predetermined locations of the first access point, the second device, and the third device.

In other features, the time difference determining module is configured to determine the first time difference of arrival based on (i) the time of departure of the first frame from the first access point, (ii) the time of arrival of the second frame at the first access point, (iii) the times of arrival of the first frame and the second frame at the second device, and (iv) the predetermined distance between the first access point and the second device; and the second time difference of arrival based on (i) the time of departure of the first frame from the first access point, (ii) the time of arrival of the second frame at the first access point, (iii) the times of arrival of the first frame and the second frame at the third device; and (iv) the predetermined distance between the first access point and the third device.

In other features, the system further comprises the second device and the third device. The second device includes a first station associated with the first access point. The first station is configured to (i) assist the first access point in determining the location of the first device, and (ii) communicate no other data; or a second access point configured to communicate on the predetermined frequency channel of the wireless network during the predetermined time slot. The third device includes a second station associated with the first access point. The second station is configured to (i) assist the first access point in determining the location of the first device, and (ii) communicate no other data; or a third access point configured to communicate on the predetermined frequency channel of the wireless network during the predetermined time slot.

In other features, the first access point, the second device, and the third device include one or more antennas and are configured to communicate on the predetermined frequency channel during the predetermined time slot via a single antenna.

In other features, the second device and the third device are configured to decode the first frame addressed to the first device and not addressed to the second device and the third device.

In other features, the second device and the third device are configured to listen to the first frame transmitted by the first access point and the second frame received by the first access point on the predetermined frequency channel during the predetermined time slot.

In another feature, the first frame transmitted by the first access point on the predetermined frequency channel during the predetermined time slot is decodable by a legacy device.

In another feature, the first device includes a legacy device incapable of decoding a fine timing measurement frame.

In other features transmission of the first frame requires an acknowledgement within a short interframe space following the first frame, and the second frame is received at the first access point within the short interframe space following the first frame.

In another feature, the first frame excludes a fine timing measurement frame.

In other features, the system further comprises an offset estimating module configured to estimate, based on times of arrival of the first frame and the second frame at the second device and the third device, frequency offsets between clocks of the first access point, the second device, and the third device. The time difference determining module is configured to determine the first time difference of arrival and the second time difference of arrival based on the frequency offsets; and remove errors due to the frequency offsets from the first time difference of arrival and the second time difference of arrival without performing clock synchronizations between the first access point, the second device, and the third device.

In other features, the timing module is configured to measure the time of departure of the first frame and the time of arrival of the second frame in baseband. The time of departure and the time of arrival include delays between a baseband portion and an antenna of the first access point. The feedback module is configured to receive the times of arrival of the first frame and the second frame measured at the second device and the third device in baseband. The times of arrival include delays between baseband portions and antennas of the second device and the third device.

In other features, the system further comprises a delay estimating module and a compensating module. The delay estimating module is configured to generate, by exchanging frames between the first access point and each of the second device and the third device, estimates of (i) the delays between the baseband portion and the antenna of the first access point, and (ii) the delays between baseband portions and antennas of the second device and the third device. The compensating module is configured to compensate the first time difference of arrival and the second time difference of arrival based on the estimates.

In other features, the transmitter is configured to transmit a third frame from the first access point to the second device on the predetermined frequency channel during a second predetermined time slot. The third frame is also received by the third device. The receiver is configured to receive, in response to the transmitter transmitting the third frame, a fourth frame at the first access point from the second device on the predetermined frequency channel during the second predetermined time slot. The fourth frame is also received by the third device. The timing module is configured to measure (i) a time of departure of the third frame from the first access point in baseband, (ii) a time of arrival of the fourth frame at the first access point in baseband. The feedback module is configured to receive times of arrival of the third frame and the fourth frame measured at the third device in baseband.

In other features, the system further comprises a delay estimating module configured to generate an estimate of a joint delay including (i) a first delay between a first baseband portion and a first antenna of the first access point, and (ii) a second delay between a second antenna and a second baseband portion of the second device. The estimate of the joint delay is based on (i) the time of departure of the third frame from the first access point measured in baseband; (ii) the time of arrival of the fourth frame at the first access point measured in baseband; (iii) the times of arrival of the third frame and the fourth frame measured at the third device in baseband; and (iv) the predetermined distances between the first access point, the second device, and the third device. The system further comprises a compensating module configured to compensate the first time difference of arrival based on the joint delay.

In other features, the transmitter is configured to transmit a third frame from the first access point to the third device on the predetermined frequency channel during a second predetermined time slot. The third frame is also received by the second device. The receiver is configured to receive, in response to the transmitter transmitting the third frame, a fourth frame at the first access point from the third device on the predetermined frequency channel during the second predetermined time slot. The fourth frame is also received by the second device. The timing module is configured to measure (i) a time of departure of the third frame from the first access point in baseband, (ii) a time of arrival of the fourth frame at the first access point in baseband. The feedback module is configured to receive times of arrival of the third frame and the fourth frame measured at the second device in baseband.

In other features, the system further comprises a delay estimating module configured to generate an estimate of a joint delay including (i) a first delay between a first baseband portion and a first antenna of the first access point, and (ii) a second delay between a second antenna and a second baseband portion of the third device. The estimate of the joint delay is based on (i) the time of departure of the third frame from the first access point measured in baseband; (ii) the time of arrival of the fourth frame at the first access point measured in baseband; (iii) the times of arrival of the third frame and the fourth frame measured at the second device in baseband; and (iv) the predetermined distances between the first access point, the second device, and the third device. The system further comprises a compensating module configured to compensate the second time difference of arrival based on the joint delay.

In other features, the first frame includes a fine timing measurement frame. The second frame includes an acknowledgement to the first frame. The feedback module configured to receive at the first access point, from the second device and the third device, times of arrival of the first frame and the second frame at the second device and the third device transmitted via respective fine timing measurement frames from the second device and the third device.

In still other features, a method comprises transmitting a first frame from a first access point on a predetermined frequency channel of a wireless network during a predetermined time slot to determine a location of a first device in the wireless network. The first frame is received by the first device, a second device, and a third device in the wireless network. the first access point, the second device, and the third device (i) are separated from each other by predetermined distances, (ii) are located at predetermined locations in the wireless network, and (iii) are configured to communicate on the predetermined frequency channel during the predetermined time slot. The method further comprises receiving, in response to transmitting the first frame, a second frame at the first access point from the first device on the predetermined frequency channel during the predetermined time slot. The second frame is also received by the second device and the third device. The method further comprises generating timing information including (i) a time of departure of the first frame from the first access point, and (ii) a time of arrival of the second frame at the first access point. The method further comprises receiving feedback information at the first access point from the second device and the third device including times of arrival of the first frame and the second frame at the second device and the third device. The method further comprises determining, at the first access point, the location of the first device based on (i) the timing information; (ii) the feedback information; and (iii) the predetermined locations of the first access point, the second device, and the third device.

In other features, the method further comprises determining, based on the timing information, the feedback information, and the predetermined distances, a first time difference of arrival between times of arrival of the second frame at the first access point and at the second device; and a second time difference of arrival between times of arrival of the second frame at the first access point and at the third device. The method further comprises determining, at the first access point, based on the first time difference of arrival and the second time difference of arrival, differences between distances from the first device to the first access point, the second device, and the third device. The method further comprises determining, at the first access point, the location of the first device based on (i) the differences between distances from the first device to the first access point, the second device, and the third device; (ii) the predetermined distances between the first access point, the second device, and the third device; and (iii) the predetermined locations of the first access point, the second device, and the third device.

In other features, the method further comprises determining the first time difference of arrival based on (i) the time of departure of the first frame from the first access point, (ii) the time of arrival of the second frame at the first access point, (iii) the times of arrival of the first frame and the second frame at the second device, and (iv) the predetermined distance between the first access point and the second device. The method further comprises determining the second time difference of arrival based on (i) the time of departure of the first frame from the first access point, (ii) the time of arrival of the second frame at the first access point, (iii) the times of arrival of the first frame and the second frame at the third device; and (iv) the predetermined distance between the first access point and the third device.

In other features, the second device includes a first station or a second access point. The third device includes a second station or a third access point. The method further comprises assisting the first access point in determining the location of the first device using the second device and the third device. The method further comprises, in response to the second device and the third device respectively including the second access point and the third access point, communicating between the first access point and each of the second access point and the third access point on the predetermined frequency channel of the wireless network during the predetermined time slot. The method further comprises, in response to the second device and the third device respectively including the first station and the second station, (i) associating the first station and the second station with the first access point, and (ii) communicating no other data using the first station and the second station.

In another feature, the method further comprises communicating on the predetermined frequency channel during the predetermined time slot via a single antenna of each of the first access point, the second device, and the third device.

In another feature, the method further comprises decoding, at the second device and the third device, the first frame addressed to the first device and not addressed to the second device and the third device.

In another feature, the method further comprises listening, at the second device and the third device, to the first frame transmitted by the first access point and the second frame received by the first access point on the predetermined frequency channel during the predetermined time slot.

In another feature, the first frame transmitted by the first access point on the predetermined frequency channel during the predetermined time slot is decodable by a legacy device.

In another feature, the first device includes a legacy device incapable of decoding a fine timing measurement frame.

In other features, the method further comprises requiring, subsequent to transmitting the first frame, an acknowledgement within a short interframe space following the first frame; and receiving the second frame at the first access point within the short interframe space following the first frame.

In another feature, the first frame excludes a fine timing measurement frame.

In other features, the method further comprises, at the first access point, estimating, based on times of arrival of the first frame and the second frame at the second device and the third device, frequency offsets between clocks of the first access point, the second device, and the third device. The method further comprises, at the first access point, determining the first time difference of arrival and the second time difference of arrival based on the frequency offsets; and removing errors due to the frequency offsets from the first time difference of arrival and the second time difference of arrival without performing clock synchronizations between the first access point, the second device, and the third device.

In other features, the method further comprises, at the first access point, measuring the time of departure of the first frame and the time of arrival of the second frame in baseband. The time of departure and the time of arrival include delays between a baseband portion and an antenna of the first access point. The method further comprises, at the first access point, receiving the times of arrival of the first frame and the second frame measured at the second device and the third device in baseband. The times of arrival include delays between baseband portions and antennas of the second device and the third device.

In other features, the method further comprises, at the first access point, generating, by exchanging frames between the first access point and each of the second device and the third device, estimates of (i) the delays between the baseband portion and the antenna of the first access point, and (ii) the delays between baseband portions and antennas of the second device and the third device. The method further comprises, at the first access point, compensating the first time difference of arrival and the second time difference of arrival based on the estimates.

In other features, the method further comprises transmitting a third frame from the first access point to the second device on the predetermined frequency channel during a second predetermined time slot. The third frame is also received by the third device. The method further comprises receiving, in response to transmitting the third frame, a fourth frame at the first access point from the second device on the predetermined frequency channel during the second predetermined time slot. The fourth frame is also received by the third device. The method further comprises measuring (i) a time of departure of the third frame from the first access point in baseband, (ii) a time of arrival of the fourth frame at the first access point in baseband. The method further comprises receiving times of arrival of the third frame and the fourth frame measured at the third device in baseband.

In other features, the method further comprises generating an estimate of a joint delay including (i) a first delay between a first baseband portion and a first antenna of the first access point, and (ii) a second delay between a second antenna and a second baseband portion of the second device. The estimate of the joint delay is based on (i) the time of departure of the third frame from the first access point measured in baseband; (ii) the time of arrival of the fourth frame at the first access point measured in baseband; (iii) the times of arrival of the third frame and the fourth frame measured at the third device in baseband; and (iv) the predetermined distances between the first access point, the second device, and the third device. The method further comprises compensating the first time difference of arrival based on the joint delay.

In other features, the method further comprises transmitting a third frame from the first access point to the third device on the predetermined frequency channel during a second predetermined time slot. The third frame is also received by the second device. The method further comprises receiving, in response to transmitting the third frame, a fourth frame at the first access point from the third device on the predetermined frequency channel during the second predetermined time slot. The fourth frame is also received by the second device. The method further comprises measuring (i) a time of departure of the third frame from the first access point in baseband, (ii) a time of arrival of the fourth frame at the first access point in baseband. The method further comprises receiving times of arrival of the third frame and the fourth frame measured at the second device in baseband.

In other features, the method further comprises generating an estimate of a joint delay including (i) a first delay between a first baseband portion and a first antenna of the first access point, and (ii) a second delay between a second antenna and a second baseband portion of the third device. The estimate of the joint delay is based on (i) the time of departure of the third frame from the first access point measured in baseband; (ii) the time of arrival of the fourth frame at the first access point measured in baseband; (iii) the times of arrival of the third frame and the fourth frame measured at the second device in baseband; and (iv) the predetermined distances between the first access point, the second device, and the third device. The method further comprises compensating the second time difference of arrival based on the joint delay.

In other features, the first frame includes a fine timing measurement frame. The second frame includes an acknowledgement to the first frame. The method further comprises receiving, at the first access point, from the second device and the third device, times of arrival of the first frame and the second frame at the second device and the third device transmitted via respective fine timing measurement frames from the second device and the third device.

In still other features, a system comprises a client station including a receiver, a transmitter, a feedback module, and a location determining module. The receiver is configured to receive, at the client station, a first frame from a first access point of a wireless network. The first frame includes a fine timing measurement frame. The first frame is also received by a second device and a third device in the wireless network. The first access point, the second device, and the third device (i) are separated from each other by predetermined distances, and (ii) are located at predetermined locations in the wireless network. The transmitter is configured to transmit, from the client station to the first access point, a second frame including an acknowledgement to the first frame. The second frame is also received by the second device and the third device. The feedback module is configured to receive, at the client station, a first feedback from the first access point including (i) time of departure of the first frame from the first access point, and (ii) time of arrival of the second frame at the first access point; and a second feedback from the second device and the third device including times of arrival of the first frame and the second frame at the second device and the third device. The location determining module is configured to determine, at the client station, a location of the client station based on (i) times of arrival and departure of the first frame and the second frame at the client station; (ii) the first feedback; (iii) the second feedback; and (iv) the predetermined locations of the first access point, the second device, and the third device.

In other features, the system further comprises a timing module configured to determine times of flight between the client station and each of the first access point, the second device, and the third device based on (i) times of arrival and departure of the first frame and the second frame at the client station, (ii) the first feedback, and (iii) the second feedback. The location determining module is configured to determine, at the client station, the location of the client station based on the times of flight between the client station and each of the first access point, the second device, and the third device; and the predetermined locations of the first access point, the second device, and the third device.

In other features, the first access point, the second device, and the third device are configured to communicate on a predetermined frequency channel during a predetermined time slot. The first access point is configured to transmit the first frame and receive the second frame on the predetermined frequency channel during the predetermined time slot.

In other features, the system further comprises the second device and the third device. The second device includes a first station associated with the first access point. The first station is configured to (i) assist the first access point in determining the location of the client station, and (ii) communicate no other data; or a second access point configured to communicate on a predetermined frequency channel of the wireless network during a predetermined time slot used by the first access point to determine the location of the client station. The third device includes a second station associated with the first access point. The second station is configured to (i) assist the first access point in determining the location of the client station, and (ii) communicate no other data; or a third access point configured to communicate on the predetermined frequency channel of the wireless network during the predetermined time slot used by the first access point to determine the location of the client station.

In other features, the first access point, the second device, and the third device include one or more antennas and are configured to communicate via a single antenna on a predetermined frequency channel during a predetermined time slot used by the first access point to determine the location of the client station.

In other features, the second device and the third device are configured to decode the first frame addressed to the client station and not addressed to the second device and the third device.

In other features, the second device and the third device are configured to listen to the first frame transmitted by the first access point and the second frame received by the first access point on a predetermined frequency channel during a predetermined time slot used by the first access point to determine the location of the client station.

In other features, the system further comprises an offset estimating module configured to estimate frequency offsets between clocks of the client station and each of the second device and the third device based on the second feedback. The timing module is configured to remove errors due to the frequency offsets from the times of flight between the client station and each of the second device and the third device.

In still other features, a method comprises receiving, at a client station, a first frame from a first access point of a wireless network. The first frame includes a fine timing measurement frame. The first frame is also received by a second device and a third device in the wireless network. the first access point, the second device, and the third device (i) are separated from each other by predetermined distances, and (ii) are located at predetermined locations in the wireless network. The method further comprises transmitting, from the client station to the first access point, a second frame including an acknowledgement to the first frame. The second frame is also received by the second device and the third device. The method further comprises receiving, at the client station, a first feedback from the first access point including (i) time of departure of the first frame from the first access point, and (ii) time of arrival of the second frame at the first access point; and a second feedback from the second device and the third device including times of arrival of the first frame and the second frame at the second device and the third device. The method further comprises determining, at the client station, a location of the client station based on (i) times of arrival and departure of the first frame and the second frame at the client station; (ii) the first feedback; (iii) the second feedback; and (iv) the predetermined locations of the first access point, the second device, and the third device.

In other features, the method further comprises determining times of flight between the client station and each of the first access point, the second device, and the third device based on (i) times of arrival and departure of the first frame and the second frame at the client station, (ii) the first feedback, and (iii) the second feedback. The method further comprises determining, at the client station, the location of the client station based on the times of flight between the client station and each of the first access point, the second device, and the third device; and the predetermined locations of the first access point, the second device, and the third device.

In other feature, the method further comprises communicating between the first access point, the second device, and the third device on a predetermined frequency channel during a predetermined time slot. The method further comprises, at the first access point, transmitting the first frame and receiving the second frame on the predetermined frequency channel during the predetermined time slot.

In other features, the second device includes a first station or a second access point. The third device includes a second station or a third access point. The method further comprises assisting the first access point in determining the location of the client station using the second device and the third device. The method further comprises, in response to the second device and the third device respectively including the second access point and the third access point, communicating between the first access point and each of the second access point and the third access point on a predetermined frequency channel of the wireless network during a predetermined time slot used by the first access point to determine the location of the client station. The method further comprises, in response to the second device and the third device respectively including the first station and the second station, (i) associating the first station and the second station with the first access point, and (ii) communicating no other data using the first station and the second station.

In other features, the method further comprises communicating, via a single antenna of each of the first access point, the second device, and the third device, on a predetermined frequency channel during a predetermined time slot used by the first access point to determine the location of the client station.

In other features, the method further comprises decoding, at the second device and the third device, the first frame addressed to the client station and not addressed to the second device and the third device.

In other features, the method further comprises listening, at the second device and the third device, to the first frame transmitted by the first access point and the second frame received by the first access point on a predetermined frequency channel during a predetermined time slot used by the first access point to determine the location of the client station.

In other features, the method further comprises estimating frequency offsets between clocks of the client station and each of the second device and the third device based on the second feedback; and removing errors due to the frequency offsets from the times of flight between the client station and each of the second device and the third device.

In still other features, a system comprises a first access point including a receiver, a transmitter, a feedback module, and a location determining module. The receiver is configured to receive, at a first access point of a wireless network, a first frame from a client station. The first frame includes a fine timing measurement frame. The first frame is also received by a second device and a third device in the wireless network. The first access point, the second device, and the third device (i) are separated from each other by predetermined distances and (ii) are located at predetermined locations in the wireless network. The transmitter is configured to transmit, from the first access point to the client station, a second frame including an acknowledgement to the first frame. The second frame is also received by the second device and the third device. The feedback module is configured to receive, at the first access point, a first feedback from the client station including (i) time of departure of the first frame from the client station, and (ii) time of arrival of the second frame at the client station; and a second feedback from the second device and the third device including times of arrival of the first frame and the second frame at the second device and the third device. The location determining module is configured to determine, at the first access point, a location of the client station based on (i) times of arrival and departure of the first frame and the second frame at the first access point; (ii) the first feedback; (iii) the second feedback; and (iv) the predetermined locations of the first access point, the second device, and the third device.

In other features, the system further comprises a time difference determining module and a timing module. The time difference determining module is configured to determine, at the first access point, based on the first feedback, the second feedback, and the predetermined distances, (i) a first time difference of arrival between times of arrival of the first frame at the first access point and at the second device, and (ii) a second time difference of arrival between times of arrival of the first frame at the first access point and at the third device. The timing module is configured to determine time of flight between the first access point and the client station based on the first feedback. The timing module is configured to determine times of flight between the client station and each of the second device and the third device based on (i) the time of flight between the first access point and the client station, (ii) the first time difference of arrival between times of arrival of the first frame at the first access point and at the second device, and (ii) the second time difference of arrival between times of arrival of the first frame at the first access point and at the third device.

In other features, the location determining module is configured to determine, at the first access point, the location of the client station based on the times of flight between the client station and each of the first access point, the second device, and the third device; and the predetermined locations of the first access point, the second device, and the third device.

In other features, the first access point, the second device, and the third device are configured to communicate on a predetermined frequency channel during a predetermined time slot. The first access point is configured to transmit the first frame and receive the second frame on the predetermined frequency channel during the predetermined time slot.

In other features, the system further comprises the second device and the third device. The second device includes a first station associated with the first access point. The first station is configured to (i) assist the first access point in determining the location of the client station, and (ii) communicate no other data; or a second access point configured to communicate on a predetermined frequency channel of the wireless network during a predetermined time slot used by the first access point to determine the location of the client station. The third device includes a second station associated with the first access point. The second station is configured to (i) assist the first access point in determining the location of the client station, and (ii) communicate no other data; or a third access point configured to communicate on the predetermined frequency channel of the wireless network during the predetermined time slot used by the first access point to determine the location of the client station.

In other features, the first access point, the second device, and the third device include one or more antennas and are configured to communicate via a single antenna on a predetermined frequency channel during a predetermined time slot used by the first access point to determine the location of the client station.

In other features, the second device and the third device are configured to decode the first frame addressed to the client station and not addressed to the second device and the third device.

In other features, the second device and the third device are configured to listen to the first frame received by the first access point and the second frame transmitted by the first access point on a predetermined frequency channel during a predetermined time slot used by the first access point to determine the location of the client station.

In other features, the system further comprises an offset estimating module configured to estimate a frequency offset between clocks of the first access point, the second device, and the third device based on the second feedback. The time difference determining module is configured to determine the first time difference of arrival and the second time difference of arrival based on the frequency offsets; and remove errors due to the frequency offsets from the first time difference of arrival and the second time difference of arrival without performing clock synchronizations between the first access point, the second device, and the third device.

In other features, the timing module is configured to measure the times of arrival and departure of the first frame and the second frame in baseband. The times of arrival and departure include delays between a baseband portion and an antenna of the first access point. The feedback module is configured to receive the first feedback and the second feedback including time measurements performed at the client station, the second device, and the third device in baseband. The time measurements include delays between baseband portions and antennas of the client station, the second device, and the third device.

In other features, the system further comprises a delay estimating module and a compensating module. The delay estimating module is configured to generate, by exchanging frames between the first access point and each of the second device and the third device, estimates of (i) the delays between the baseband portion and the antenna of the first access point; and (ii) the delays between baseband portions and antennas of the client station, the second device, and the third device. The compensating module is configured to compensate, based on the estimates, (i) the first time difference of arrival between times of arrival of the first frame at the first access point and at the second device, and (ii) the second time difference of arrival between times of arrival of the first frame at the first access point and at the third device.

In still other features, a method comprises receiving, at a first access point of a wireless network, a first frame from a client station. The first frame includes a fine timing measurement frame. The first frame is also received by a second device and a third device in the wireless network. The first access point, the second device, and the third device (i) are separated from each other by predetermined distances and (ii) are located at predetermined locations in the wireless network. The method further comprises transmitting, from the first access point to the client station, a second frame including an acknowledgement to the first frame. The second frame is also received by the second device and the third device. The method further comprises receiving, at the first access point, a first feedback from the client station including (i) time of departure of the first frame from the client station, and (ii) time of arrival of the second frame at the client station; and a second feedback from the second device and the third device including times of arrival of the first frame and the second frame at the second device and the third device. The method further comprises determining, at the first access point, a location of the client station based on (i) times of arrival and departure of the first frame and the second frame at the first access point; (ii) the first feedback; (iii) the second feedback; and (iv) the predetermined locations of the first access point, the second device, and the third device.

In other features, the method further comprises determining, at the first access point, based on the first feedback, the second feedback, and the predetermined distances, (i) a first time difference of arrival between times of arrival of the first frame at the first access point and at the second device, and (ii) a second time difference of arrival between times of arrival of the first frame at the first access point and at the third device. The method further comprises determining time of flight between the first access point and the client station based on the first feedback. The method further comprises determining times of flight between the client station and each of the second device and the third device based on (i) the time of flight between the first access point and the client station, (ii) the first time difference of arrival between times of arrival of the first frame at the first access point and at the second device, and (ii) the second time difference of arrival between times of arrival of the first frame at the first access point and at the third device.

In other features, the method further comprises determining, at the first access point, the location of the client station based on the times of flight between the client station and each of the first access point, the second device, and the third device; and the predetermined locations of the first access point, the second device, and the third device.

In other features, the method further comprises communicating between the first access point, the second device, and the third device on a predetermined frequency channel during a predetermined time slot; and at the first access point, transmitting the first frame and receiving the second frame on the predetermined frequency channel during the predetermined time slot.

In other features, the second device includes a first station or a second access point. The third device includes a second station or a third access point. The method further comprises assisting the first access point in determining the location of the client station using the second device and the third device. The method further comprises in response to the second device and the third device respectively including the second access point and the third access point, communicating between the first access point and each of the second access point and the third access point on a predetermined frequency channel of the wireless network during a predetermined time slot used by the first access point to determine the location of the client station. The method further comprises, in response to the second device and the third device respectively including the first station and the second station, (i) associating the first station and the second station with the first access point, and (ii) communicating no other data using the first station and the second station.

In other features, the method further comprises communicating, via a single antenna of each of the first access point, the second device, and the third device, on a predetermined frequency channel during a predetermined time slot used by the first access point to determine the location of the client station.

In other features, the method further comprises decoding, at the second device and the third device, the first frame addressed to the client station and not addressed to the second device and the third device.

In other features, the method further comprises listening, at the second device and the third device, to the first frame transmitted by the first access point and the second frame received by the first access point on a predetermined frequency channel during a predetermined time slot used by the first access point to determine the location of the client station.

In other features, the method further comprises estimating a frequency offset between clocks of the first access point, the second device, and the third device based on the second feedback; determining the first time difference of arrival and the second time difference of arrival based on the frequency offsets; and removing errors due to the frequency offsets from the first time difference of arrival and the second time difference of arrival without performing clock synchronizations between the first access point, the second device, and the third device.

In other features, the method further comprises measuring the times of arrival and departure of the first frame and the second frame in baseband. The times of arrival and departure include delays between a baseband portion and an antenna of the first access point. The method further comprises receiving the first feedback and the second feedback including time measurements performed at the client station, the second device, and the third device in baseband. The time measurements include delays between baseband portions and antennas of the client station, the second device, and the third device.

In other features, the method further comprises generating, by exchanging frames between the first access point and each of the second device and the third device, estimates of (i) the delays between the baseband portion and the antenna of the first access point; and (ii) the delays between baseband portions and antennas of the client station, the second device, and the third device. The method further comprises compensating, based on the estimates, (i) the first time difference of arrival between times of arrival of the first frame at the first access point and at the second device, and (ii) the second time difference of arrival between times of arrival of the first frame at the first access point and at the third device.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

The present disclosure relates to determining a location of a network device (e.g., a client station) in a wireless local area network (WLAN). The location of a client station is determined by performing a single exchange of frames between the client station and an access point, where the single exchange of frames includes transmitting exactly one frame and receiving exactly one frame between the two network devices. The access point is assisted by at least two other network devices (called sensors) located at known distances and known locations relative to the access point in the WLAN. For example, the other network devices may include client stations dedicated to assist the access point. Alternatively, the other network devices may include other access points. The other network devices snoop the exchange of frames between the access point and the client station and provide feedback to the access point or the client station. Based on the feedback, the access point or the client station can determine the location of the client station. The client station, the access point, and the other assisting network devices may or may not implement fine timing measurement (FTM) procedure defined in the IEEE 802.11v specification, which is incorporated herein by reference.

The systems and methods of the present disclosure obviate the need to perform multiple frame exchanges between the access point and the client station to determine the location of the client station. The systems and methods do not require performing clock synchronization between the access point and the client station before making timing measurements related to the frame exchange to accurately determine the location of the client station. To further improve accuracy, the systems and methods can compensate the timing measurements for delays occurring between baseband processors and antennas of the network devices while transmitting and receiving frames. These and other features are explained below in detail.

The IEEE 802.11v specification is primarily intended for clock synchronization between different WLAN devices. Communication protocols defined in the IEEE 802.11v specification can also be used to determine distance or time of flight (ToF) between different WLAN devices. After the promulgation of the IEEE 802.11v specification, other WLAN specifications have been proposed with higher signal bandwidths. The time resolution achieved by the IEEE 802.11v specification is insufficient for the higher bandwidths proposed in the other WLAN specifications. For example, the current resolution for time of flight defined in the IEEE 802.11v specification is 10 ns. This can be reduced to 0.1 ns to accommodate current and future changes to the 802.11 specification.

Figure 1:
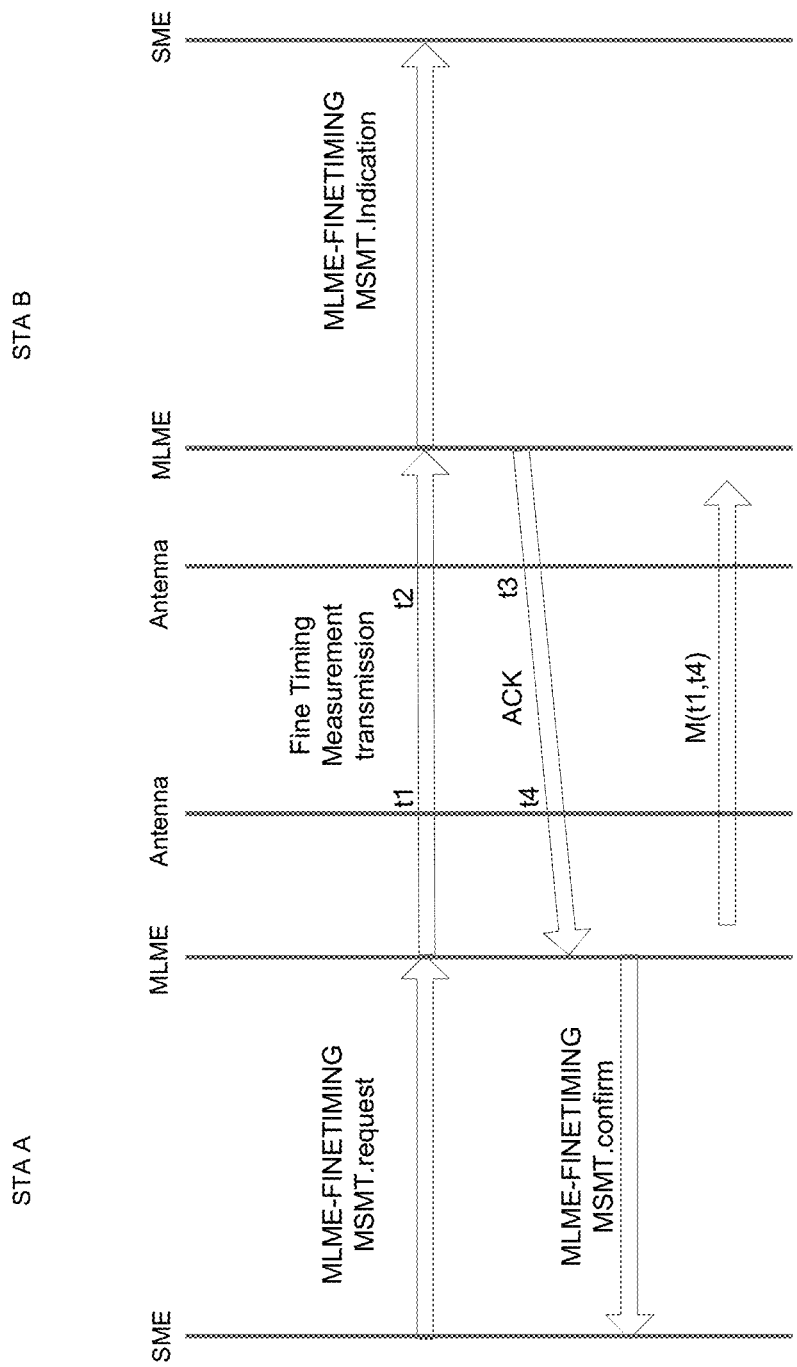
FIG. 1 is a signaling diagram depicting a fine timing measurement (FTM) frame exchange between two network devices.
Figure 2:
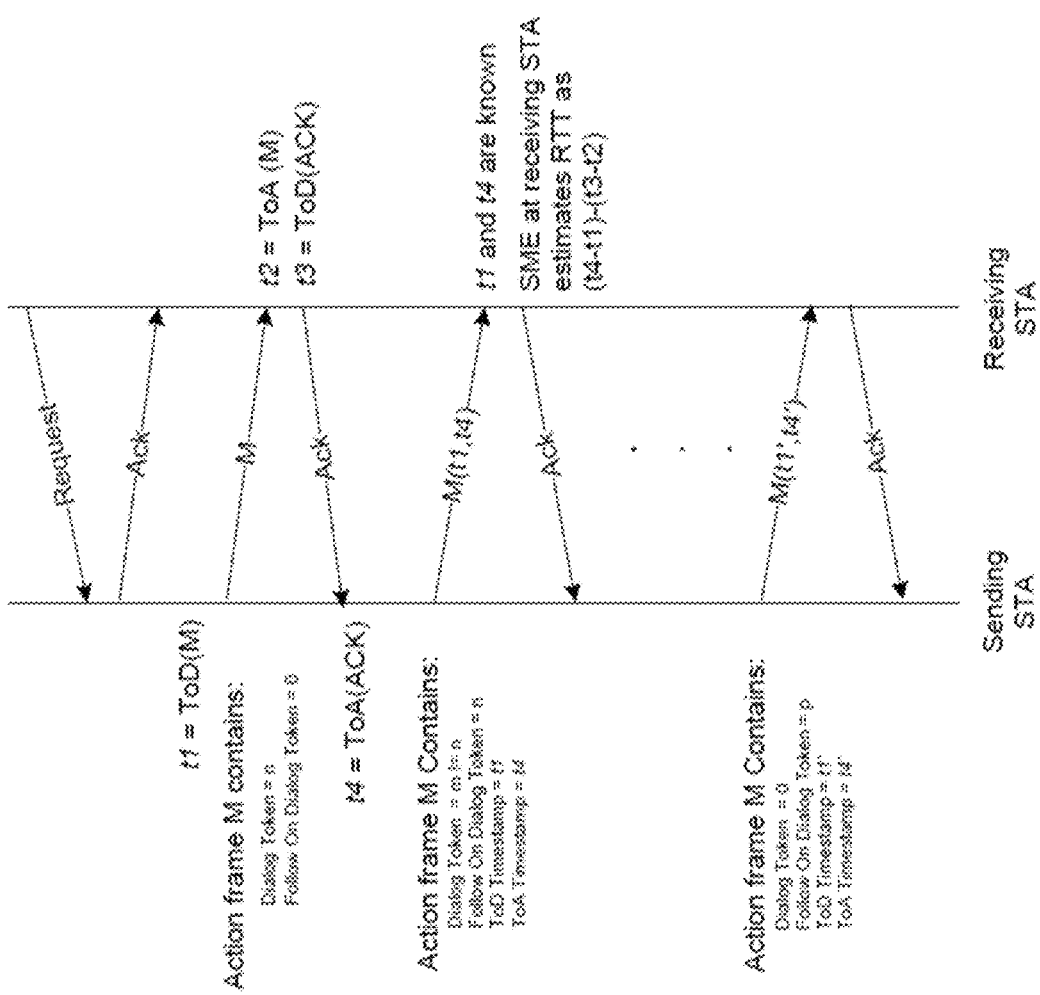
FIG. 2 is a signaling diagram depicting the FTM frame exchange in further detail.

FIGS. 1 and 2 show a fine timing measurement (FTM) procedure used to measure time of flight (ToF) between two devices. For example, consider two client stations STA-A and STA-B operating in a WLAN in a small/medium enterprise (SME). In FIG. 1, MLME stands for medium access control (MAC) sublayer management entity, and MSMT stands for measurement. STA-B initiates an FTM request by sending a request frame to STA-A. STA-A responds by sending a corresponding acknowledgment frame. The FTM request and the corresponding acknowledgement are respectively shown as Request and ACK at the top of FIG. 2. The FTM request and the corresponding acknowledgement are followed by STA-A sending an FTM frame to STA-B (shown as frame M in FIG. 2). The FTM frame leaves a transmit antenna of STA A at time t1 and arrives at a receive antenna of STA B at time t2. STA-A and STA-B measure timestamps when the FTM frame leaves the transmit antenna from STA-A (t1) and when the FTM frame arrives at the receive antenna at STA-B (t2).

STA-B responds by sending an acknowledgement (ACK) frame to STA-A. The ACK frame leaves a transmit antenna of STA-B at time t3 and arrives at a receive antenna of STA-A at time t4. STA-B and STA-A measure timestamps when the ACK frame leaves the transmit antenna of STA-B (t3) and when the ACK frame arrives at the receive antenna of STA-A (t4).

STA-A feeds back t1 and t4 to STA-B. STA-B then computes the round trip time (RTT), which is twice the ToF between STA-A and STA-B, as RTT=(t4−t1)−(t2−t3)=(t2−t1)+(t4−t3). The ToF between STA-A and STA-B is RTT/2. FIG. 2 shows additional frame exchanges performed between STA-A (sending STA) and STA-B (receiving STA).

There can be three use cases in which the above FTM exchanges can be conducted. Case-1: A client station (e.g., a handheld device), whose location is to be determined, can initiate the FTM exchanges with multiple fixed APs having known locations to get time of flight (ToF) or distances to the APs. The client station can then derive its own location based on the distances, locations of the APs sent by the APs, and preloaded floor map of the area, by using ToF locationing computation. The term "locationing" as used in the present disclosure means determining location.

Case-2: Multiple coordinated APs in an area can initiate respective FTM exchanges with a client station whose location is to be determined. The APs derive distances and then calculate the location of the client station on the AP side by using ToF locationing computation.

Case-3: The FTM exchanges are conducted between APs. A client station, whose location is to be determined, "snoops" these exchanges between the APs to figure out time difference of arrival (TDoA) with multiple APs. Then, based on prior knowledge of locations of the APs, the client station figures out its own location using TDoA locationing computation.

All these cases require the AP and the client station to implement the FTM procedure with high time of departure (ToD) and time of arrival (ToA) estimation accuracy. Many network devices (e.g., legacy network devices), however, may not implement the FTM procedure and therefore may be unable to participate in FTM-based locationing. Further, the AP/client station with inaccurate ToD or ToA may reduce the accuracy of the FTM-based locationing.

Instead, an AP-centric TDoA locationing procedure described below may be used for locationing. The AP-centric TDoA locationing procedure does not require the client station to support any new protocol (e.g., the FTM procedure). The AP-centric TDoA locationing procedure provides many benefits. For example, as described below in detail, clock offsets are removed without performing any extra synchronization exchanges (e.g., synchronization procedure described in IEEE 802.11v). Additionally, analog/RF delays at transmitters and receivers of participating APs/client stations can be calibrated using a simple procedure with high accuracy without using circuit calibration at the APs/client stations and without using calibration on the client station side. Further, the AP-centric TDoA locationing procedure can be extended to the case where the client station supports the FTM exchange, in which case, the AP-centric TDoA locationing procedure may become a ToF-based locationing procedure as explained below in detail.

Before describing the AP-centric TDoA locationing procedure, the clock offset and the analog delay issues are briefly described. Clock offsets can adversely affect timing measurements and locationing (i.e., location determination). When frames are exchanged between two devices, each device measures timing (i.e., timestamps) of arrival and departure of the frames based on its own internal clock. The frequencies of the clocks of the two devices, however, can be offset relative to each other by as much as 40 ppm according to the IEEE PHY specifications. The frequency offset leads to accumulated clock offsets from the time when the devices are powered on or from the time of last clock synchronization. Accordingly, the same time instance is recorded as different timestamps at STA A and STA B.

IEEE 802.11v proposes a method to estimate this clock offset at a certain time with coarse resolutions. For example, the same actual time instance $t_k$ is recorded at STA-A and STA-B as $t_k(A)$ and $t_k(B)$, respectively, with the following relationship:

$$t_k(B)=t_k(A)(1+ppm_{BA})+d_{BA}$$

$ppm_{BA}$ is the clock offset in ppm of STA-B relative to STA-A.

$d_{BA}$ is the delta of the initial timestamp count of STA-B and STA-A

The method, however, has to be repeated periodically to re-correct the clock offset. Instead, the locationing (i.e., location determination) method of the present disclosure automatically removes the effects of the clock off set as described below in detail.

Analog delays that occur between the baseband processors and antennas of the devices while transmitting and receiving frames can also adversely affect the timing measurements and locationing. Typical WLAN transmitter implementations split the signal processing into two stages: A digital (or baseband) block and an RF block. The baseband block takes the digital information (bits), encodes the bits and maps them to a predefined constellation, and performs an FFT on the bits before passing the bits to the RF block. The RF block performs digital to analog conversion, up-conversion to the carrier frequency, and any necessary amplification of the signal right before transmission.

Similarly, typical WLAN receiver implementations split the signal processing into two stages: an RF block and a digital (or baseband) block. The RF block receives the analog signal from the antenna, filters the signal to remove out-of-band interference, down-converts the signal to baseband, amplifies the signal as necessary, and performs analog-to-digital conversion. The baseband block processes the digital signal (e.g., performs FFT/channel estimation/decoding).

At the transmitter side, the actual time of departure (ToD) of a frame at a transmit antenna is expressed as:

$$t_{ToD}=t_{ToD}^{(BB)}+D^{(A\_Tx)}$$

$t_{ToD}^{(BB)}$ is ToD recorded at digital baseband DAC input.
$D^{(A\_Tx)}$ is transmitter analog delay between DAC and Tx antenna.

At the receiver side, the actual time of arrival (ToA) of a frame at a receive antenna is expressed as:

$$t_{ToD}=t_{ToA}^{(BB)}-D^{(A\_Rx)}$$

$t_{ToA}^{(BB)}$ is ToA recorded at digital baseband ADC input.
$D^{(A\_Rx)}$ is receiver analog delay between Rx antenna and ADC.

Typically the analog transmit/receive (Tx/Rx) delays need complex calibrations for the FTM protocol support. Instead, the locationing method of the present disclosure performs simple delay estimation as described below in detail, which eliminates the need for any complex calibration.

Figure 3:
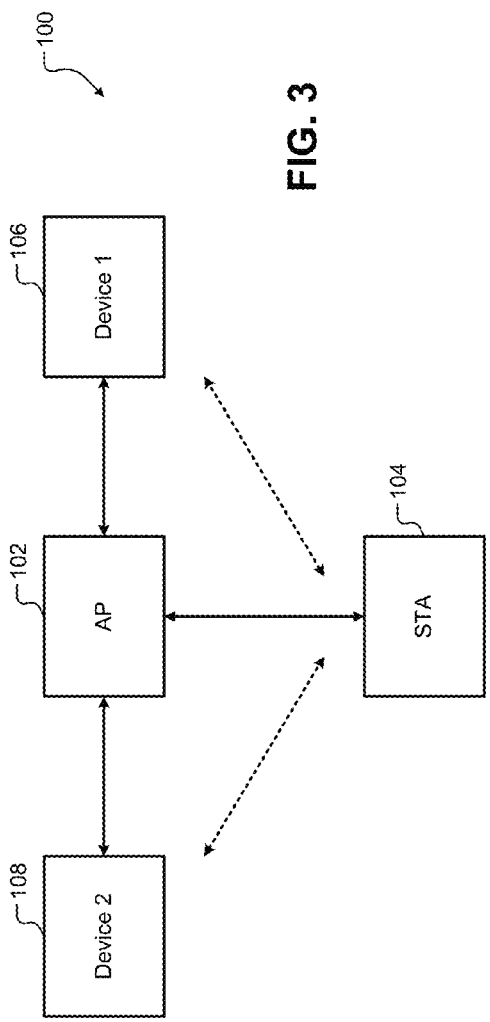
FIG. 3 is a functional block diagram of a wireless network comprising an access point, a client station, and a plurality of network devices configured to assist the access point in determining a location of the client station.

FIG. 3 shows an example of a first embodiment of the present disclosure, which includes a system 100 comprising an access point (AP) 102, a client station (STA) 104, and at least two other network devices, Device-1 106 and Device-2 108, which assist the AP 102 in determining the location of the STA 104. While only two devices 106, 108 are shown, additional devices may be used. The STA 104 may include a legacy client station that does not implement the FTM procedure.

The AP 102 and the two devices 106, 108 are located at fixed distances from each other and at fixed locations in a WLAN. The AP 102 knows the fixed distances and the fixed locations of the two devices 106, 108. The AP 102 performs a single frame exchange with the STA 104 to determine the location of the STA 104. The two devices 106, 108 snoop the frames exchanged between the AP 102 and the STA 104 and perform timing measurements relating to the frames received at the respective devices. The two devices 106, 108 feedback the timing measurements to the AP 102. The AP 102 determines the location of the STA 104 based on the feedback and the known distances and locations of the devices 106, 108.

The devices 106, 108 may include client stations 106, 108. The client stations 106, 108 are associated with the AP 102 and communicate only the data that is necessary to assist the AP 102 in determining the location of the STA 104. The client stations 106, 108 communicate no other data (i.e., normal traffic) except the data relating to providing the feedback to the AP 102 to determine the location of the STA 104. Therefore, the client stations 106, 108 and the AP 102 operate in the same frequency channel (e.g., a predetermined frequency channel).

Alternatively, the devices 106, 108 may include other APs 106, 108 that are located adjacent to (i.e., nearby) the AP

102. During a locationing time slot, in which the AP 102 and the STA 104 perform the single frame exchange, the other APs 106, 108 are configured to switch to the same frequency channel as the AP 102 (e.g., the predetermined frequency channel). For example, the WLAN in which the system 100 operates may define an internal protocol to periodically (e.g., during each locationing time slot) switch APs adjacent to the AP 102 (e.g., the other APs 106, 108) to a locationing mode in which these adjacent APs switch to the same frequency channel as the AP 102 (e.g., the predetermined frequency channel).

Without losing generality, the AP 102 may be referred to as "center AP"; and the devices 106, 108 may be referred to as "sensor STAs" or simply as "sensors" 106, 108 and may be shown as "S1" and "S2" in some of the drawings. It is understood that, in the following discussion, the devices 106, 108 may include either client stations, access points, or a combination thereof. It is further understood that the devices 106, 108 are configured to operate in the same frequency channel as the AP 102 (e.g., the predetermined frequency channel) during each locationing time slot. Further, the AP 102 and the devices 106, 108 may each include multiple antennas (e.g., antennas arranged in a MIMO configuration). The AP 102 and the devices 106, 108, however, may each use a single antenna for transmit/receive operations performed during the locationing time slots.

Figure 4:
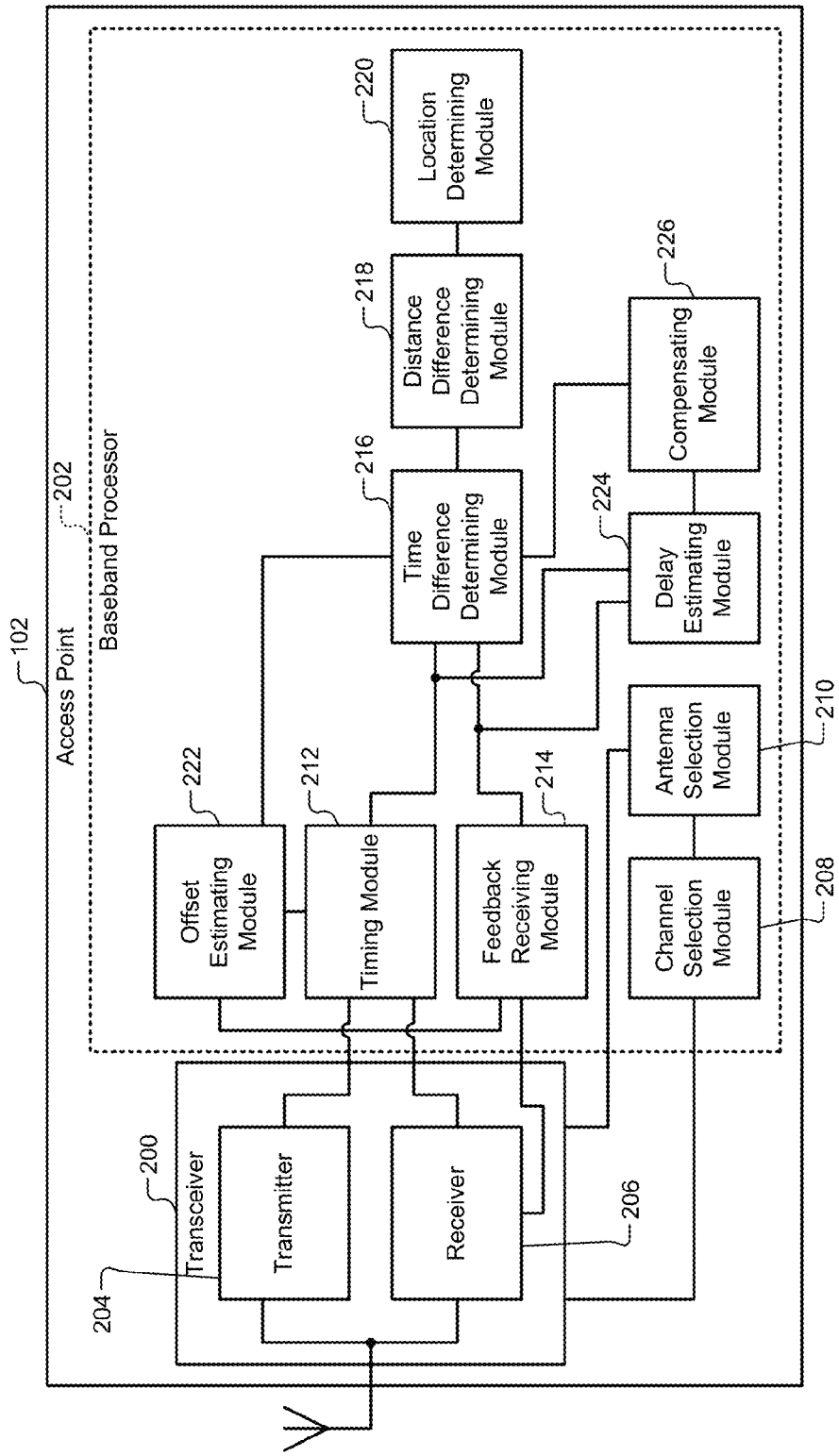
FIG. 4 is a functional block diagram of the access point shown in FIG. 3.

FIG. 4 shows the AP 102 in detail. The AP 102 includes a transceiver 200 and a baseband processor 202. The transceiver 200 includes a transmitter 204 and a receiver 206. The baseband processor 202 includes a channel selection module 208, an antenna selection module 210, a timing module 212, and a feedback receiving module 214. The baseband processor 202 further includes a time difference determining module 216, a distance difference determining module 218, and a location determining module 220. The channel selection module 208 switches the operation of the AP 102 to a predetermined frequency channel during the locationing time slot. While only one antenna is shown, the AP 102 may include multiple antennas (e.g., antennas arranged in a MIMO configuration). The antenna selection module 210 selects a single antenna to transmit and receive frames during the locationing time slot. The functions and operations of the remaining modules of the AP 102 are described below in detail with reference to FIG. 7.

Figure 5:
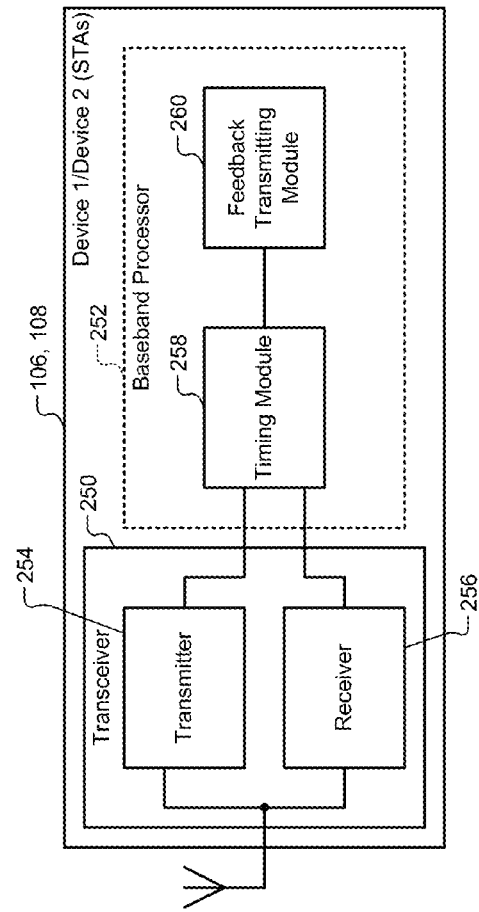
FIG. 5 is a functional block diagram showing a first example implementation of the plurality of network devices shown in FIG. 3.

FIG. 5 shows an example of the devices 106, 108, where the devices 106, 108 are implemented as client stations (STAs). While only one antenna is shown, the devices 106, 108 may include multiple antennas (e.g., antennas arranged in a MIMO configuration). Normally, the devices 106, 108 may be configured to operate in the same channel as the AP 102 (e.g., the predetermined frequency channel). Nonetheless, while not shown, the devices 106, 108 may each include a channel selection module that switches the devices, 106, 108 to the same frequency channel in which the AP 102 operates (e.g., the predetermined frequency channel) during the locationing time slot. Further, while not shown, when the devices 106, 108 include multiple antennas, the devices 106, 108 may each include an antenna selection module that selects a single antenna to transmit and receive frames during the locationing time slot. The devices 106, 108 each include a transceiver 250 and a baseband processor 252. The transceiver 250 includes a transmitter 254 and a receiver 256. The baseband processor 252 includes a timing module 258 and a feedback transmitting module 260. The functions and operations of each of these modules of the devices 106, 108 are described below in detail with reference to FIG. 7.

Figure 6:
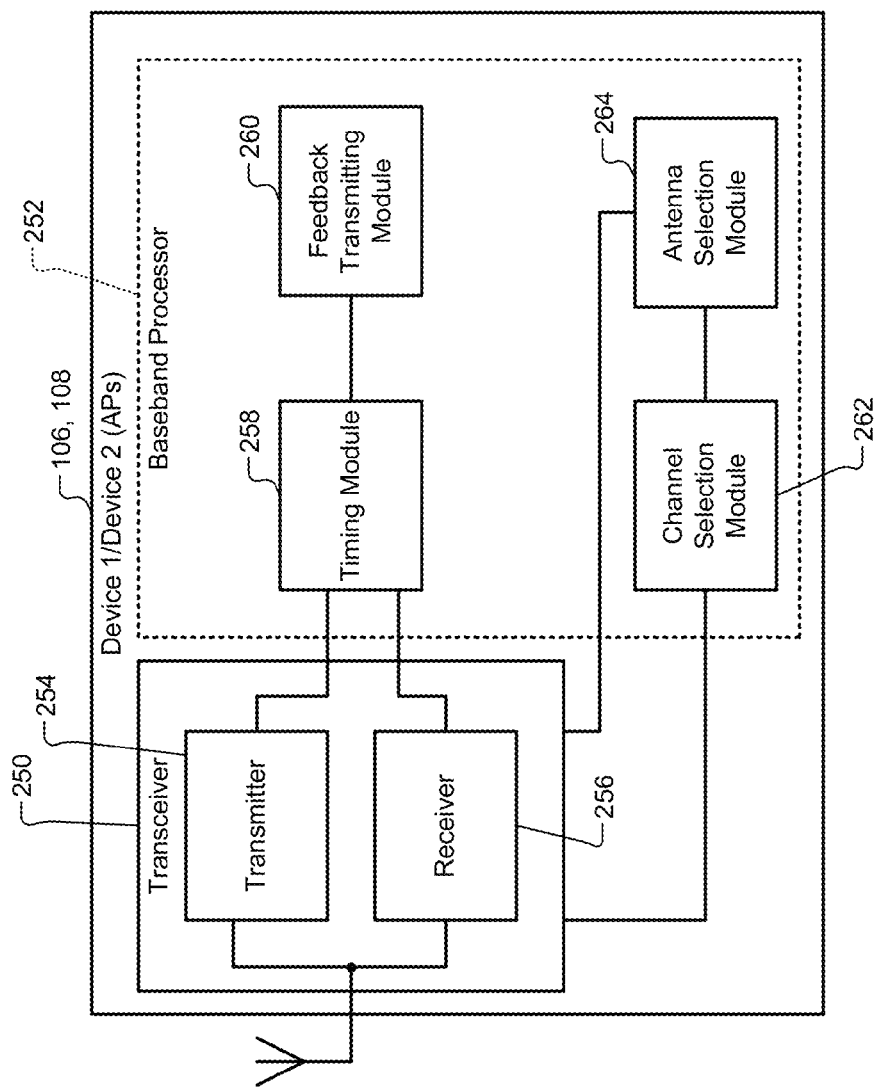
FIG. 6 is a functional block diagram showing a second example implementation of the plurality of network devices shown in FIG. 3.

FIG. 6 shows another example of the devices 106, 108, where the devices 106, 108 are implemented as APs. While only one antenna is shown, the devices 106, 108 may include multiple antennas (e.g., antennas arranged in a MIMO configuration). The devices 106, 108, when implemented as APs, include all of the modules shown in FIG. 5, and additionally include a channel selection module 262 and an antenna selection module 264. In each of the devices 106, 108, the channel selection module 262 switches the respective device to the same frequency channel in which the AP 102 operates (e.g., the predetermined frequency channel) during the locationing time slot. The antenna selection module 264 selects a single antenna to transmit and receive frames during the locationing time slot. The functions and operations of the remaining modules of the devices 106, 108 are described below in detail with reference to FIG. 7.

Figure 7:
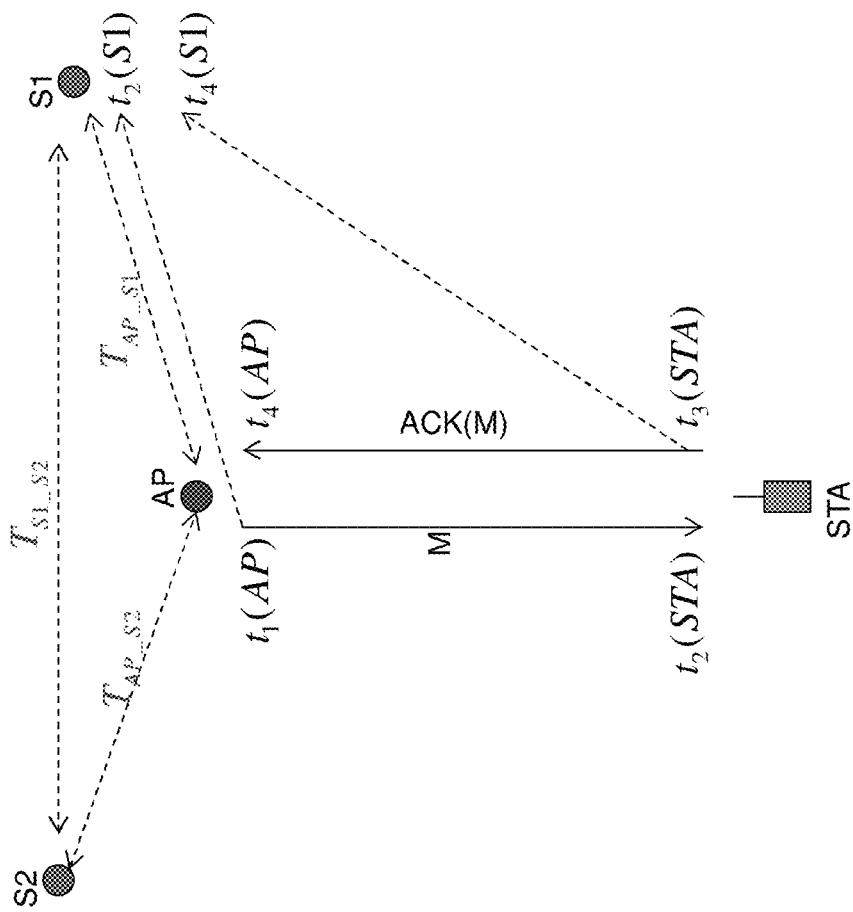
FIG. 7 is a signaling diagram showing a single frame exchange performed between the access point and the client station to determine a location of the client station.

FIG. 7 shows data exchanged between the AP 102, the STA 104, and the sensors S1, S2 (i.e., the devices 106, 108). In FIG. 7, $T_{AP\_S1}$ and $T_{AP\_S2}$ respectively denote time of flight values (i.e., distances) between the AP 102 and each of the sensors S1, S2; and $T_{S1\_S2}$ denotes a time of flight value (i.e., distance) between the sensors S1, S2. The AP 102 knows these time of flight values (i.e., distances). These time of flight values (i.e., distances) are also referred to as predetermined distances between the respective devices.

In FIG. 7, note that neither the STA 104 nor the AP 102 initiates locationing by exchanging a request frame and a corresponding acknowledgment frame shown as Request and ACK at the top of FIG. 2. Nor do the AP 102 and the STA 104 exchange multiple frames shown as M and ACKs in FIG. 2. Instead, the AP 102 and the STA 104 perform a single frame exchange in which the AP 102 transmits a single frame to the STA 104, and in response, the STA 104 transmits a single frame to the AP 102.

Specifically, in step 1, the transmitter 204 of the AP 102 transmits a frame M to the STA 104. The timing module 212 of the AP 102 measures a time of departure (ToD) of the frame M at the AP 102 as t1(AP). The timing module 212 of the AP 102 measures the time t1 at which the transmitter 204 of the AP 102 transmits the frame M from the AP 102 to the STA 104. That is, the timing module 212 of the AP 102 timestamps the frame M with the time t1 when the transmitter 204 of the AP 102 transmits the frame M from the AP 102 to the STA 104.

The time of arrival (ToA) of the frame M at the STA 104 is t2(STA). The receiver 256 of each of the sensors S1, S2 "snoops" this same frame M. The timing module 258 of each of the sensors S1, S2 measures the ToA of the same frame M as t2(S1), t2(S2). The timing module 258 of each of the sensors S1, S2 measures the times t2(S1), t2(S2) at which the receiver 256 of each of the sensors S1, S2 receives the frame M from the AP 102. That is, the timing module 258 of each of the sensors S1, S2 timestamps the frame M with the times t2(S1), t2(S2) when the receiver 256 of each of the sensors S1, S2 receives the frame M from the AP 102.

The sensors S1, S2 are programmed to be able to decode any frame transmitted from the AP, including the frame M with a destination address of the STA 104. That is, the sensors S1, S2 are programmed to be able to decode any frame transmitted from the AP, including the frame M not addressed to the sensors S1, S2. The sensors S1, S2 may also be programmed to listen to the frames transmitted from the AP 102 and the following ACK frames received by the AP 102 during the locationing time slots. The sensors S1, S2 may be further programmed to enter into a power save mode or a sleep mode during time periods other than the locationing time slots. Accordingly, while not shown, the devices 106, 108 may further include a power save module that switches operation of the devices 106, 108 from a normal mode, in which the devices 106, 108 provide feedback to the AP 102, to a power save mode or sleep mode, in which the devices 106, 108 are partially or fully powered down to save power.

The frame M may include any frame that is understandable (i.e., decodable) by any legacy STA (not necessarily an FTM frame). The frame M requires an immediate response frame or an immediate acknowledgment frame, ACK(M), within a short interframe space (SIFS) immediately following the frame M. The frame M frame may include an identifier so that timestamps associated with a particular frame M may be identified using the identifier to determine the location of the STA 104. Non-limiting examples of the frame M include (i) a request to send (RTS) frame, to which an ACK(M) frame is a clear to send (CTS) frame sent by the STA 104; and (ii) a regular data or quality of service (QoS)-Null frame, to which an ACK(M) frame is a corresponding ACK frame. Other examples of the frame M may include any frame understood by legacy devices.

In step 2, the STA 104 sends back an immediate response frame, ACK(M), within the SIFS following the frame M. A time of departure (ToD) of the response frame ACK(M) at the STA 104 is t3(STA). The receiver 206 of the AP 102 receives the response frame ACK(M). The timing module 212 of the AP 102 measures a time of arrival (ToA) of the response frame ACK(M) at the AP 102 as t4(AP). The timing module 212 of the AP 102 measures the time t4 at which the receiver 206 of the AP 102 receives the response frame ACK(M) from the STA 104. That is, the timing module 212 of the AP 102 timestamps the response frame ACK(M) with the time t4 when the receiver 206 of the AP 102 receives the response frame ACK(M) from the STA 104.

Each of the sensors S1, S2 "snoops" this same ACK(M) frame. That is, the receiver 256 of each of the sensors S1, S2 also receives this same ACK(M) frame. The timing module 258 of each of the sensors S1, S2 measures the ToA of the same frame ACK(M) at each of the sensors S1, S2 respectively as t4(S1), t4(S2). The timing module 258 of each of the sensors S1, S2 measures the times t4(S1), t4(S2) at which the receiver 256 of each of the sensors S1, S2 receives the response frame ACK(M) from the STA 104. That is, the timing module 258 of each of the sensors S1, S2 timestamps the response frame ACK(M) with the times t4(S1), t4(S2) when the receiver 256 of each of the sensors S1, S2 receives the response frame ACK(M) from the STA 104.

In step 3, the sensors S1, S2 feedback of the measured ToAs t2/t4 along with the identifier associated with the corresponding M and ACK(M) frames to the AP 102. Specifically, feedback transmitting module 260 of each of the sensors S1, S2 generates a feedback frame that includes the measured ToAs t2/t4 along with the identifier associated with the corresponding M and ACK(M) frames. The timing module 258 of each of the sensors S1, S2 may timestamp the respective feedback frames. The transmitter 254 of each of the sensors S1, S2 transmits the respective feedback frame to the AP 102. The receiver 206 at the AP 102 receives the feedback frames from the sensors S1, S2.

Now the AP 102 has the following timestamp information associated with the M-ACK(M) exchange:

$$[t_1(AP) t_4(AP) t_2(S1) t_4(S1) t_2(S2) t_4(S2) \ldots]$$

Each of the feedback frames may include any frame internally defined by the WLAN (e.g., by the AP 102 and the sensors S1, S2). For example, the feedback frames may reuse the FTM frame format by modifying reuse the FTM frame format to include the snooping timestamps.

On receiving these feedback frames, an offset estimating module 222 of the AP 102 estimates the frequency offset between the AP 102 and each of the sensors S1, S2:

$$[\text{ppm}_{AP\_S1}\ \text{ppm}_{AP\_S2} \ldots]$$

In step 4, the time difference determining module 216 of the AP 102 computes time difference of arrival (TDoA) from the STA 104 to the AP 102 and to each of the sensors S1, S2 using one or more groups of the above timestamps/ppms and the known distances between the AP 102 and sensors S1, S2.

In some implementations, to refine the TDoA accuracy, the AP 102 and the STA 104 may perform multiple frame exchanges; the AP 102 may receive corresponding feedback frames from the sensors S1, S2; and the time difference determining module 216 may utilize multiple groups of timestamps/ppms responding to the different M-ACK(M) exchanges to determine multiple TDoA's.

For simplicity of illustration, suppose that all timestamps include accurate analog Tx/Rx delays at both the AP 102 and the sensors S1, S2. That is, suppose that all ToD and ToA measurements represent values measured at antenna output/input (i.e., ignore any inaccurate analog delay estimation).

The TDoA between the AP 102 and the sensor S1 106 is given by the following equation:

$$T_{DoA_{AP_{S1}}} = [t_4(AP) - t_4(S1) \cdot (1 - \text{ppm}_{AP_{S1}})] + [t_2(S1) \cdot (1 - \text{ppm}_{AP_{S1}}) - t1(AP) - T_{AP_{S1}}]$$

where $T_{AP\_S1}$ is the time of flight (i.e., the distance) between the AP 102 in the sensor S1 known to the AP 102; and $\text{ppm}_{AP\_S1}$ is a frequency offset between the AP 102 and the sensor S1 measured by the offset estimating module 222 of the AP 102 based on the feedback frame received by the receiver 206 of the AP 102 from the transmitter 254 of the sensor S1 106. The above equation removes clock offset automatically as follows.

Recall that the relationship between the timestamps and clock offsets between devices A and B is expressed in terms of the following equation:

$$t_k(B) = t_k(A)(1 + \text{ppm}_{BA}) + d_{BA} = t_k(A)(1 - \text{ppm}_{AB}) + d_{BA}$$

Accordingly, the above equation for $T_{DoA\_AP\_S1}$ becomes:

$$T_{DoA\_AP\_S1} = [t_4(AP) - t_4(S1) \cdot (1 - \text{ppm}_{AP\_S1})] + [t_2(S1) \cdot (1 - \text{ppm}_{AP\_S1}) - t_1(AP) - T_{AP\_S1}]$$

$$= [t_4(AP) - t_4(S1) \cdot (1 - \text{ppm}_{AP\_S1}) - d_{S1\_AP}] + [t_2(S1) \cdot (1 - \text{ppm}_{AP\_S1}) - t_1(AP) - T_{AP\_S1}]$$

$$= [t_4(AP) - t_{4\_S1}(AP)] + [t_{2\_S1}(AP) - t_1(AP) - T_{AP\_S1}]$$

$$= [t_4(AP) - t_{4\_S1}(AP)]$$

where $t_{k\_S1}$ denotes timestamp $t_k$ at the sensor S1 as if measured by the clock of the AP 102. Essentially, the term $[t_{2\_S1}(AP) - t_1(AP) - T_{AP\_S1}]$ can be eliminated by bringing all the timestamps to the AP 102's clock based on the estimated frequency offset, and since the time of flight of the frame M from the AP 102 to the sensor S1 is equal to the known distance between the AP 102 and the sensor S1.

Thus, based on the frequency offsets between the AP 102 and each of the sensors S1, S2 estimated by the offset estimating module 222, the time difference determining module 216 generates a more accurate estimate of $T_{DoA\_AP\_S1}$. Therefore, no specific clock synchronization (e.g., using the IEEE 802.11v synchronization) between the AP 102 and the sensors S1, S2 is needed, and the above TDoA computation automatically removes the clock offset.

The time difference determining module 216 of AP 102 performs similar TDoA computation for all the sensors (e.g., the sensor S2). Based on the TDoA between the AP 102 and each of the sensors S1, S2, the distance difference determining module 218 of the AP 102 generates distance differences from the STA 104 to each of the AP 102 and the sensors S1, S2. The location determining module 220 determines the location of the STA 104 based on the distance differences, the known locations of the AP 102 and the sensors S1, S2, and the known distances between the AP 102 and the sensors S1, S2.

As indicated above, in some implementations, the AP 102 may perform multiple M-ACK(M) exchanges with the STA 104, and receive feedbacks of timestamps from the sensors S1, S2 corresponding to these frames. Time difference determining module 216 may average multiple computations of TDoA to improve accuracy of locationing.

The discussion above assumes accurate ToD/ToA from/to the antennas at both the AP 102 and each of the sensors S1, S2. That is, the above TDoA computations presume that the analog Tx/Rx delays are all calibrated correctly. The calibration process, however, can be complex. Instead, the AP 102 uses the following simple procedure to jointly calibrating analog delays between the AP 102 and each of the sensors S1, S2.

Recall that the ToD and ToA include analog delays:

$$t_1(AP) = t_1^{(BB)}(AP) + D^{(A\_Tx)}(AP)$$

$$t_2(S1) = t_2^{(BB)}(S1) + D^{(A\_Rx)}(S1)$$

$$t_4(AP) = t_4^{(BB)}(AP) + D^{(A\_Rx)}(AP)$$

$$t_4(S1) = t_4^{(BB)}(S1) + D^{(A\_Rx)}(S1)$$

Figure 8:
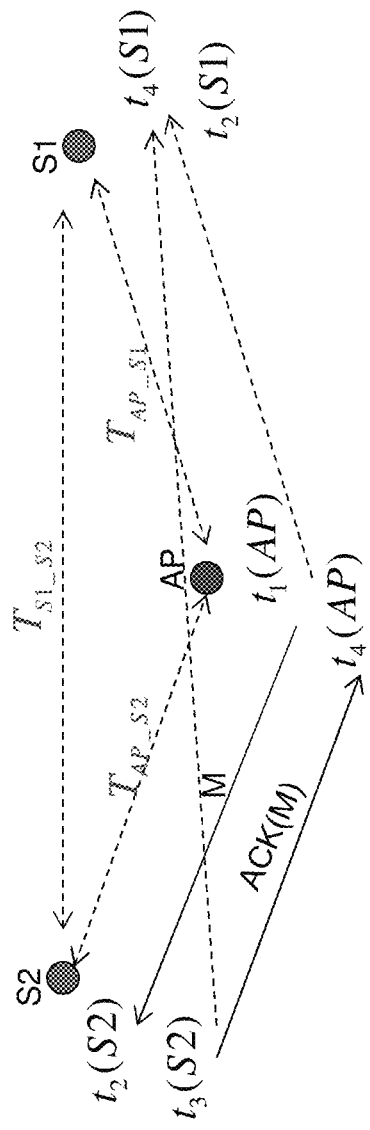
FIG. 8 is a signaling diagram showing a frame exchange performed between the access point and one of the plurality of network devices to determine analog delays occurring in transmissions between the access point and the one of the plurality of network devices.

FIG. 8 shows another M-ACK(M) frame exchange performed by the AP 102 with one of the sensors (e.g., sensor S2) with known location during a calibration time slot while the other sensor (e.g., sensor S1) overhears (i.e., snoops) the exchange between the AP 102 and the sensor S2. Similar M-ACK(M) frame exchange can be performed by the AP 102 with the other sensor (e.g., sensor S1) with known location during a calibration time slot while the sensor (e.g., sensor S2) overhears (i.e., snoops) the exchange between the AP 102 and the sensor S1. In each M-ACK(M) frame exchange performed by the AP 102 with the sensors S1, S2, the timestamp feedback procedure described above is used, except that the STA 104 is replaced by the sensor S1 or S2.

The timing module 212 of the AP 102 generates timing information (i.e., timestamps) for the M-ACK(M) frame exchanged with each of the sensors S1, S2. In each M-ACK (M) frame exchange, the feedback receiving module 214 of the AP 102 receives a feedback frame from the snooping sensor including timestamps indicating times at which the snooped frames were received at the snooping sensor. Based on the timing information from the timing module 212 and the feedback information from the feedback receiving module 214, a delay estimation module 224 estimates a joint analog delay compensation factor for the TDoA's.

For example, the joint analog delay compensation factor for the TDoA computation between AP and S1 is given by the following equation:

$$D_{AP\_S1} = [t_4^{(BB)}(AP) - t_4^{(BB)}(S1)\cdot(1-ppm_{AP\_S1})] + [t_2^{(BB)}(S1)\cdot(1-ppm_{AP\_S1}) - t_1^{(BB)}(AP) - T_{AP\_S1}] - [T_{AP\_S2} - T_{S1\_S2}]$$

where BB indicates that the timestamp measurements are made by the timing modules 212 of the AP 102 and the timing module 258 of each of the sensors S1, S2 in baseband. Similar analog delay calibration may be performed for TDoA between the AP 102 and the sensor S2, and other sensors, if any.

During actual TDoA measurement with the STA 104, all timestamps may be measured in baseband. A compensating module 226 of the AP 102 compensates the TDoA values by the calibrated analog delay values as follows.

$$T_{DoA_{AP_{S1}}} = [t_4^{(BB)}(AP) - t_4^{(BB)}(S1)\cdot(1-ppm_{AP_{S1}})] + [t_2^{(BB)}(S1)\cdot$$
$$(1-ppm_{AP_{S1}}) - t_1^{(BB)}(AP) - T_{AP_{S1}}] + D_{AP_{S1}}$$

$$T_{DoA_{AP_{S2}}} = [t_4^{(BB)}(AP) - t_4^{(BB)}(S2)\cdot(1-ppm_{AP_{S2}})] + [t_2^{(BB)}(S2)\cdot$$
$$(1-ppm_{AP_{S2}}) - t_1^{(BB)}(AP) - T_{AP_{S2}}] + D_{AP_{S2}}$$

The TDoA locationing method described above may also be performed between the sensors S1, S2, and corresponding TDoA values may be fed back to the AP 102 for centric location computation.

In the following embodiments, the systems and methods perform modified FTM procedures and perform locationing at the AP 102 or the STA 104 using TDoA and/or ToF. Specifically, the STA 104 does not perform multiple FTM frame exchanges with each of the AP 102 and the sensors S1, S2 to figure out ToF between the STA 104 and each of the AP 102 and the sensors S1, S2. Instead, the STA 104 and the AP 102 use a modified FTM procedure in that the AP 102 or the STA 104 use a single FTM frame exchange between the STA 104 and the AP 102 to determine the TDoA and/or ToF between the STA 104 and each of the AP 102 and the sensors S1, S2, which reduces network overhead. As in the first embodiment, the sensors S1, S2 snoop the FTM frame exchange between the STA 104 and the AP 102 and provide feedback to the AP 102 or the STA 104, based on which the STA 104 or the AP 102 determine the location of the STA 104.

Figure 9:
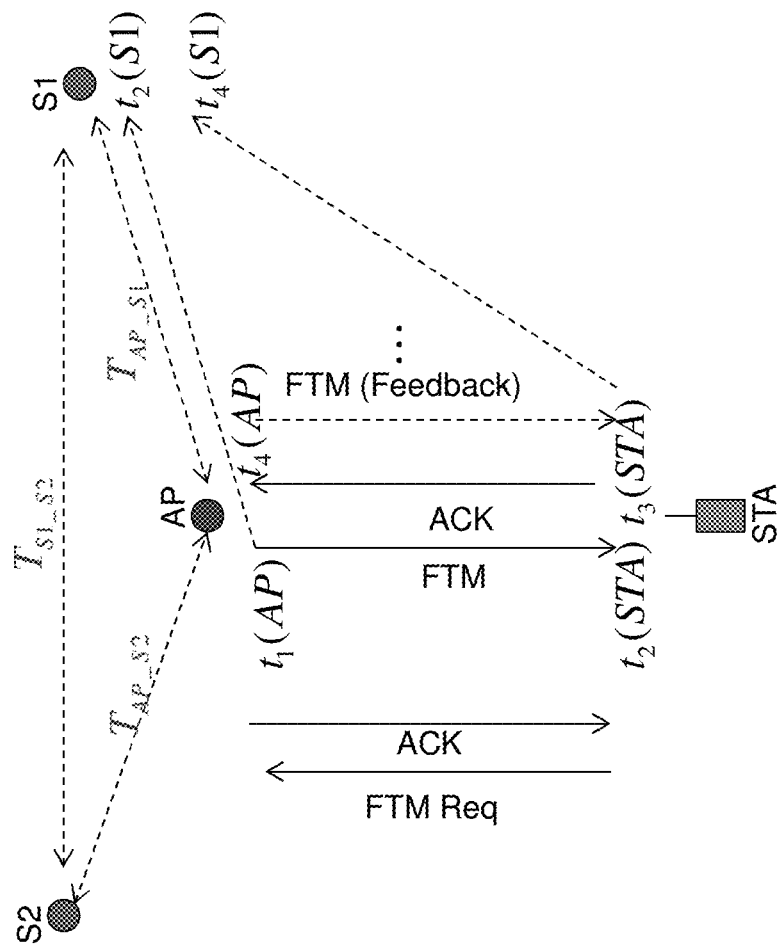
FIG. 9 is a signaling diagram showing a single FTM frame exchange performed between the access point and the client station, where the client station initiates the FTM exchange, and the plurality of network devices provides feedback to the access point to determine the location of the client station.

FIG. 9 shows an example of a second embodiment of the present disclosure, which includes the same system 100, except that each of the AP 102, the sensors S1, S2, and the STA 104 can implement the FTM procedure set forth in IEEE 802.11v. Therefore, the M-ACK(M) frame exchanges in the second embodiment and in the other embodiments described below include the FTM frame exchange defined in IEEE 802.11v. The AP 102 and the STA 104 perform the FTM frame exchange described below to accurately measure RTT (or ToF) between them. Meanwhile, the sensors S1, S2 overhear (i.e., snoop) the FTM frame exchange between the AP 102 and the STA 104. After the FTM frame exchange, each of the sensors S1, S2 feeds back its measured timestamps (t2(S) and t4(S)) of the snooped frames in the FTM frame exchange (also called snooping timestamps) to the AP 102, based on which the AP 102 is able to compute TDoA and perform locationing.

Specifically, the STA 104 sends an FTM request to the AP 102, and in response, the AP 102 sends an FTM frame to the STA 104. On receiving an ACK to the FTM frame from the STA 104, the AP 102 feeds back timestamps (t1, t4) to the STA 104, and the STA 104 is able to figure out ToF (i.e., distance) to the AP 102. Meanwhile, the sensors S1, S2 overhear (i.e., snoop) the FTM frame exchange between the AP 102 and the STA 104 and send respective snooping timestamps to the AP 102 via respective FTM frames, which are modified to include the feedback of the snooping timestamps.

Specifically, in each of the sensors S1, S2, the feedback transmitting module 260 generates the feedback frame, and the timing module 258 includes the snooping timestamp in the respective feedback frame indicating a time of arrival of the snooped frame at the respective sensor (see FIGS. 5 and 6). The feedback frame has a FTM frame format that is modified to include the snooping timestamps.

As described in the first embodiment, the AP 102 is able to derive the TDoA's based on the feedback from the sensors S1, S2. Since the STA 104 does not feedback its timestamps to the AP 102 in the FTM frame exchange, the AP 102 does not know ToF between the AP 102 and the STA 104. Therefore, the AP 102 cannot derive the ToF between the STA 104 and each of the sensors S1, S2, and the AP 102 performs locationing using the TDoA method described in the first embodiment.

Figure 10:
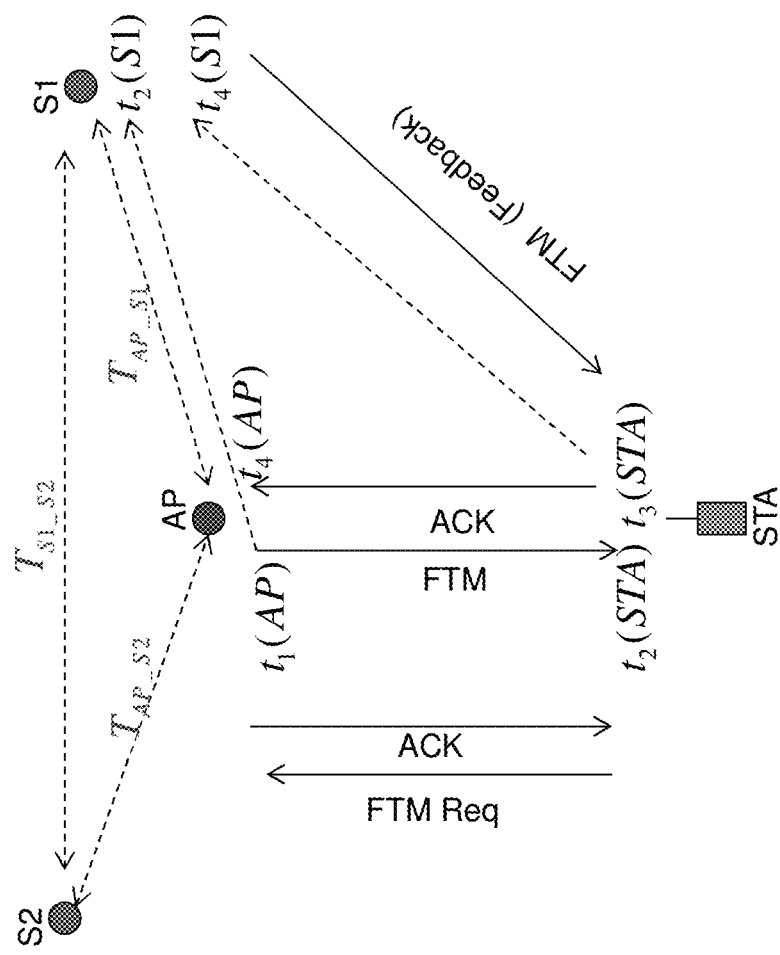
FIG. 10 is a signaling diagram showing a single FTM frame exchange performed between the access point and the client station, where the client station initiates the FTM exchange, and the plurality of network devices provides feedback to the client station to determine the location of the client station.
Figure 11:
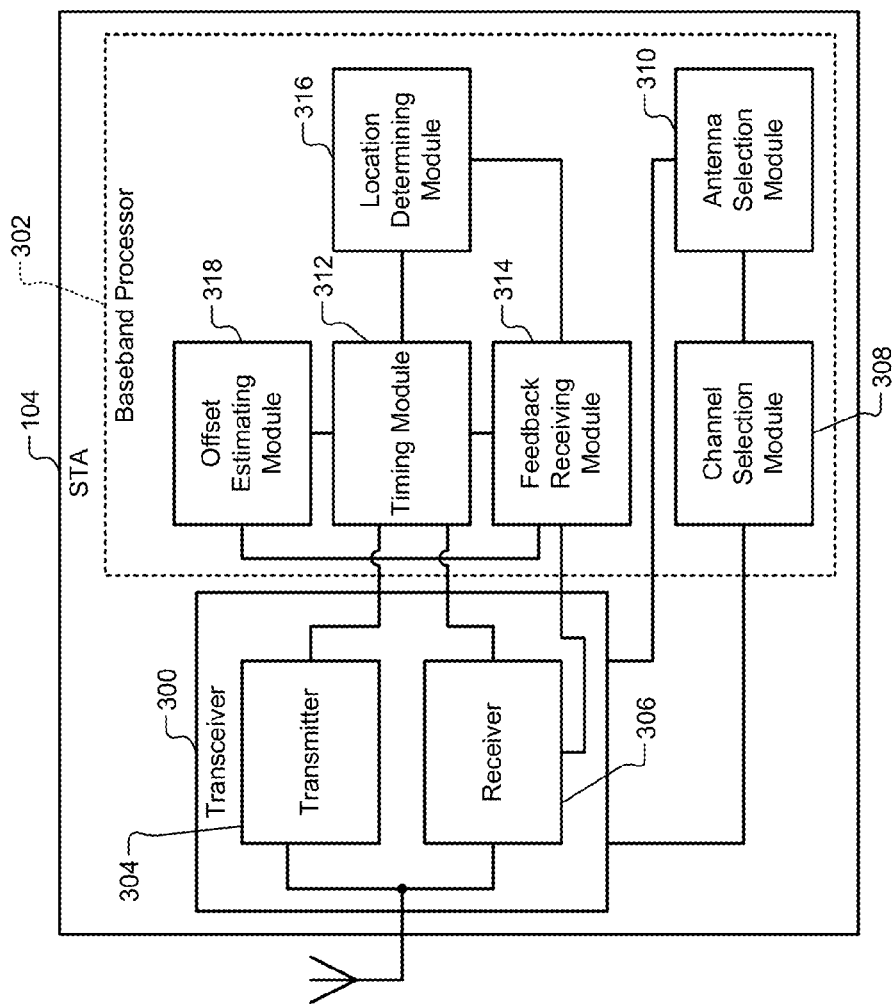
FIG. 11 is a functional block diagram of the client station shown in FIG. 3.

FIGS. 10 and 11 show an example of a third embodiment of the present disclosure, in which the STA computes its own location as follows. That is, in the third embodiment, the locationing is STA-centric. The third embodiment is similar to the second embodiment except that the sensors S1, S2 feedback the snooping timestamps to the STA instead of to the AP after snooping a single FTM frame exchange between the STA and the AP as shown in FIG. 10.

FIG. 11 shows the STA 104 in detail. The STA 104 includes a transceiver 300 and a baseband processor 302. The transceiver 300 includes a transmitter 304 and a receiver 306. The baseband processor 302 includes a channel selection module 308, and antenna selection module 310, a timing module 312, and a feedback receiving module 314. The baseband processor 302 further includes a location determining module 316 and an offset estimating module 318. The channel selection module 308 switches the STA 104 to a predetermined frequency channel during the locationing time slot. The predetermined frequency channel is the same frequency channel in which the AP 102 operates during the locationing time slot. While only one antenna is shown, the STA 104 may include multiple antennas (e.g., antennas arranged in a MIMO configuration). The antenna selection module 310 selects a single antenna to transmit and receive frames during the locationing time slot.

As shown in FIG. 10, the transmitter 304 of the STA 104 initiates the FTM procedure with the AP 102 by sending an FTM request frame to the AP 102. After the receiver 306 of the STA 104 receives a corresponding acknowledgment (ACK) from the AP 102, the receiver 306 of the STA 104 receives an FTM frame (M) from the AP 102. The transmitter 204 of the AP 102 transmits the FTM frame (M) at time t1, and the receiver 306 of the STA 104 receives the FTM frame (M) at time t2. The transmitter 304 of the STA 104 transmits an acknowledgment (ACK) for the FTM frame (M) at time t3 to the AP 102. The receiver 206 of the AP 102 receives the acknowledgment (ACK) at time t4.

The timing module 312 of the STA 104 measures the time t2 at which the receiver 306 of the STA 104 receives the FTM frame (M) from the AP 102 and the time t3 at which the transmitter 304 of the STA 104 transmits the acknowledgment (ACK) to the AP 102. That is, the timing module 312 of the STA 104 timestamps the FTM frame (M) with the time t2 when the receiver 306 of the STA 104 receives the FTM frame (M) from the AP 102 and timestamps the acknowledgment (ACK) with the time t3 when the transmitter 304 of the STA 104 transmits the acknowledgment (ACK) to the AP 102.

In the FTM frame exchange performed with the AP 102, the feedback receiving module 314 of the STA 104 receives feedback information including timestamps t1 and t4 from the AP 102. t1 and t4 are timestamps measured by the timing module 212 of the AP respectively indicating the ToD and ToA of the FTM frame (M) and the acknowledgment (ACK) at the AP 102. Thus, the STA 104 knows the times t1 to t4.

Additionally, the sensors S1, S2 snoop the FTM frame (M) and the corresponding acknowledgment (ACK). The timing modules 258 of the sensors S1, S2 timestamp these frames when these frames are received by the sensors S1, S2. The sensors S1, S2 feedback timing information including these timestamps to the STA 104 via FTM frames having the modified frame format described in the second embodiment. The feedback receiving module 314 of the STA 104 receives this feedback information from the sensors S1, S2.

The timing module 312 of the STA 104 determines times of flight between the STA 104 and each of the AP 102 and the sensors S1, S2 based on all of the feedback information received from the AP 102 and the sensors S1, S2. The feedback receiving module 314 of the STA 104 also receives information regarding the predetermined distances between the AP 102 and the sensors S1, S2 and regarding the predetermined locations of the AP 102 and the sensors S1, S2 in the frames received from the AP 102 and the sensors S1, S2. The location determining module 316 of the STA 104 determines the location of the STA 104 based on the times of flight between the STA 104 and each of the AP 102 and the sensors S1, S2, and the predetermined distances and the predetermined locations of the AP 102 and the sensors S1, S2.

The offset estimating module 318 of the STA 104 also measures the frequency offset between the STA 102 and each of the sensors S1, S2 based on the feedback frames received from the sensors S1, S2. Accordingly, the timing module 312 can accurately determine the ToF's between the STA 104 and each of the AP 102 and the sensors S1, S2 as follows (using similar equation as below for $T_{oF\_STA\_S2}$).

$$T_{oF\_STA\_S1} = [t_4(S1) \cdot (1-\text{ppm}_{STA\_S1}) - t_3(STA)]$$

That is, the offset estimating module 318 of the STA 104 brings the timestamps t4(S1), t4(S2) at the sensors S1, S2 to the STA 104's clock, assuming the STA 104 and the sensors S1, S2 have the same initial clock count; i.e., $d_{STA\_S1}=0$ and $d_{STA\_S2}=0$.

The STA 104 and the sensors S1, S2, however, may have different initial clock counts, $d_{STA\_S1}$ and $d_{STA\_S2}$, before the FTM frame exchange between the STA 104 and the AP 102. Therefore, the STA 104 may perform another frame exchange (e.g., the synchronization exchange defined in IEEE 802.11v) with the sensors S1, S2 to synchronize the clocks between the STA 104 and the sensors S1, S2.

Based on the synchronization exchange performed by the STA 104 with each of the sensors S1, S2, the offset estimating module 318 can remove the initial clock count difference that may exist between the STA 104 and the sensors S1, S2 so that $d_{STA\_S1}=0$, and $d_{STA\_S2}=0$. For example, with the estimated frequency offset between the STA 104 and the sensor S1 on receiving the feedback frame from the sensor S1, the timestamp t4(S1) can be corrected as follows:

$$t_4(S1) \cdot (1-\text{ppm}_{STA\_S1}) t_{4\_S1}(STA)$$

Similarly, the clock offset between the STA 104 and the sensor S2 can be estimated and its effect removed from the timestamp t4(S2). The timing module 312 of the STA 104 corrects these timestamps based on the frequency offsets estimated by the offset estimating module 318 and uses the corrected timestamps and removes errors due to the frequency offsets from the times of flight.

To reduce the effects of analog RF delays, the STA 104 may perform an internal delay calibration. Alternatively, the timing module 312 that timestamps the frames transmitted and received by the STA 104 can be arranged closest to the antenna of the STA 104 so that the timestamps closely track actual times at which frames are transmitted from and received by the antenna. Similarly, as an alternative to performing the joint analog delay calibration and compensation described in the first embodiment, the timing modules of each of the AP 102, the sensors S1, S2, and the STA 104 can be arranged closest to the antennas of the respective devices in all of the embodiments described herein.

Figure 12:
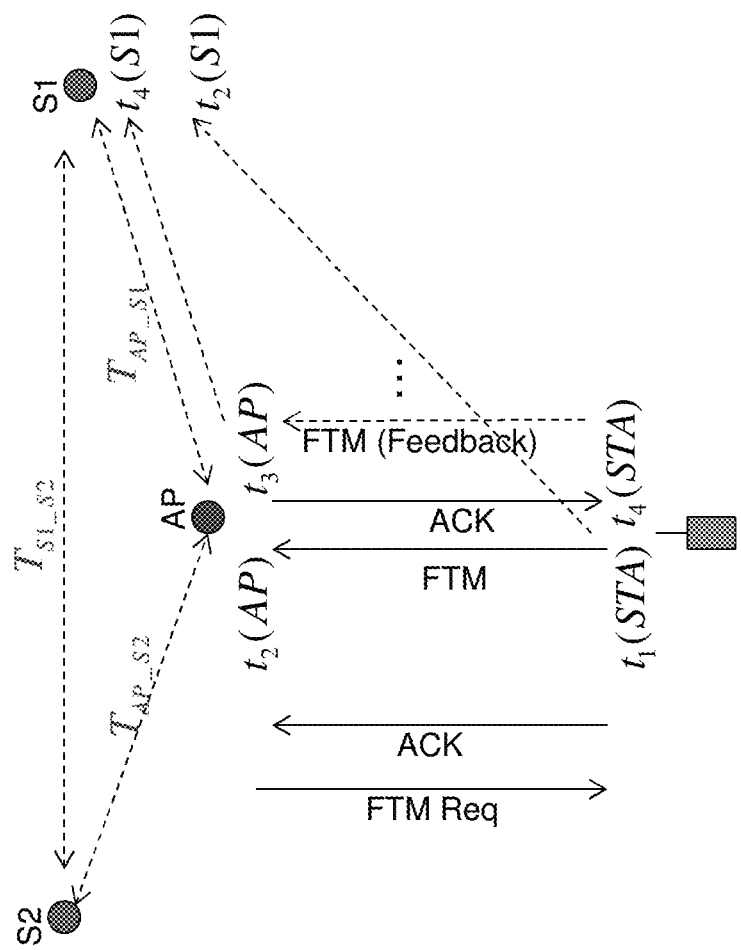
FIG. 12 is a signaling diagram showing a single FTM frame exchange performed between the access point and the client station, where the access point initiates the FTM exchange, and the plurality of network devices provides feedback to the access point to determine the location of the client station.
Figure 13:
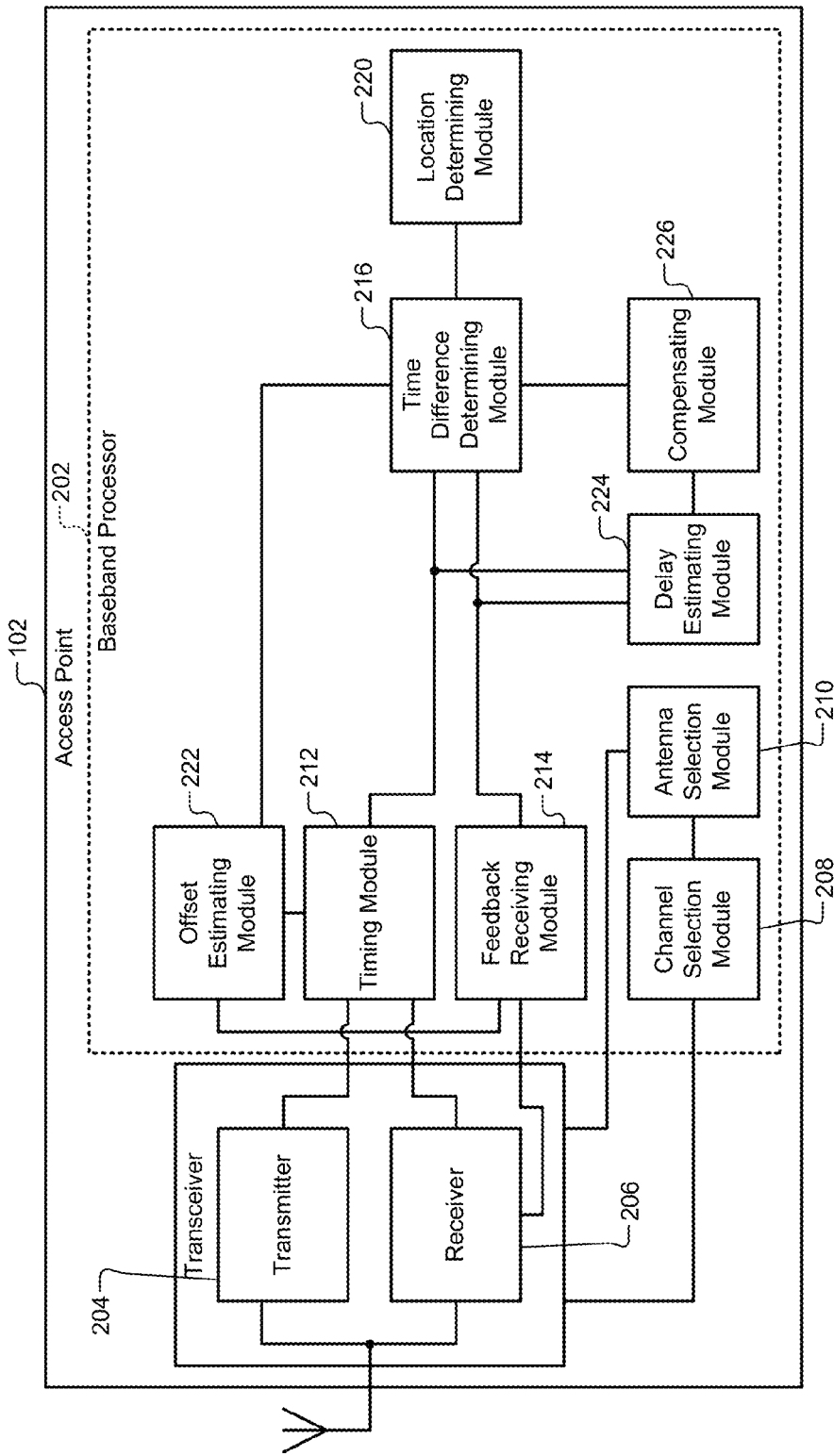
FIG. 13 is a functional block diagram of the access point configured to perform the FTM frame exchange shown in FIG. 12.

FIGS. 12 and 13 show an example of a fourth embodiment of the present disclosure. In the fourth embodiment, as shown in FIG. 12, the AP 102 sends the FTM request to the STA 104, and the STA 104 sends the FTM frame to the AP 102. The STA 104 then feeds back timing information (t1, t4) to the AP 102, and the AP 102 is able figure out ToF or distance to the STA 104. Meanwhile, the sensors S1, S2 overhear (i.e., snoop) the FTM frame exchange between the AP 102 and the STA 104 and feedback their measured snooping timestamps to the AP 102 using a modified FTM frame format including the snooping timestamps. Based on the feedback, the AP 102 is able to derive the TDoA. Based on the TDoA, and since the AP 102 knows the exact distance to the STA 104 from the FTM frame exchange, and knows the distances to and locations of the sensors S1, S2, the AP 102 can derive the ToF's from the STA 104 to each of the AP 102 and the sensors S1, S2. Then the AP 102 computes the location of the STA using the ToF's.

FIG. 13 shows the AP 102, which is the same as the AP 102 shown in FIG. 4, except that the AP 102 in FIG. 12 does not include the distance difference determining module 218, which is included in the AP 102 shown in FIG. 4. Initially, the transmitter 204 of the AP 102 transmits an FTM request to the STA 104. The STA 104 transmits a corresponding acknowledgment (ACK) to the AP 102.

Next, the STA transmits an FTM frame (M) to the AP 102. The receiver 206 of the AP 102 receives the FTM frame (M) from the STA 104. The FTM frame (M) transmitted by the STA 104 is also received by the sensors S1, S2. In response to receiving the FTM frame (M) from the STA 104, the transmitter 204 of the AP 102 transmits the acknowledgement (ACK). Thus, the AP 102 and the STA 104 perform a single FTM frame exchange similar to other embodiments disclosed herein.

The sensors S1, S2 snoop the FTM frame exchange between the AP 102 and the STA 104. The sensors S1, S2 timestamp the FTM frame (M) when the FTM frame (M) transmitted by the STA 104 is received by the sensors S1, S2. The sensors S1, S2 also timestamp the ACK frame when the ACK frame transmitted by the AP 102, which the AP 102 transmits in response to receiving the FTM frame (M) from the STA 104, is received by the sensors S1, S2.

The feedback transmitting modules 260 of the sensors S1, S2 include these timestamps in respective feedback frames, which have the modified FTM frame format described above. The sensors S1, S2 transmit these feedback frames to the AP 102. The receiver 206 of the AP 102 receives the feedback frames from the sensors S1, S2. The feedback receiving module 214 of the AP 102 receives the snooping timestamps included in the feedback frames received from the sensors S1, S2. Additionally, the feedback receiving module 214 of the AP 102 receives, from the STA 104, timing information including ToD of the FTM frame (M) from the STA 104 and ToA of the ACK frame at the STA 104 through the FTM frame exchange with the STA 104.

The time difference determining module 216 of the AP 102 determines TDoA's based on the timing information received from the STA 104, the feedback received from the sensors S1, S2, and the predetermined distances between the AP 102 and each of the sensors S1, S2. The timing module 212 of the AP 102 determines ToF between the AP 102 and the STA 104 based on the FTM frame exchange. The timing module 212 of the AP 102 determines times of flight between the STA 104 and each of the sensors S1, S2 based on the ToF between the AP 102 and the STA 104 and the TDoA's. The location determining module 220 of the AP 102 determines the location of the STA 104 based on the times of flight between the client station and each of the AP 102 and the sensors S1, S2; and the predetermined locations of the AP 102 and the sensors S1, S2.

The offset estimating module 222 of the AP 102 estimates frequency offsets between clocks of the AP 102 and the sensors S1, S2 based on the feedback received from the sensors S1, S2. The delay estimating module 224 estimates analog delays as described in the first embodiment.

Based on the estimated frequency offsets and delays, using procedures similar to those described in detail in the first embodiment, the time difference determining module 216 of the AP 102 determines the TDoA between the AP 102 and the sensor S1 as follows.

$$T_{DoA\_AP\_S1}=[t_2(AP)-t_2(S1)\cdot(1-\text{ppm}_{AP\_S1})]+[t_4(S1)\cdot(1-\text{ppm}_{AP\_S1})-t_3(AP)-T_{AP\_S1}]$$

or $$T_{DoA\_AP\_S1}=[t_2^{(BB)}(AP)-t_2^{(BB)}(S1)\cdot(1-\text{ppm}_{AP\_S1})]+[t_4^{(BB)}(S1)\cdot(1-\text{ppm}_{AP\_S1})-t_3^{(BB)}(AP)-T_{AP\_S1}]+D_{AP\_S1}$$

Then the timing module 212 of the AP 102 can accurately determine the time of flight between the STA 104 and the sensor S1 as follows:

$$T_{oF\_S1\_STA}=T_{oF\_AP\_STA}-T_{DoA\_AP\_S1}$$

where the time of flight between the AP 102 and the STA 104, $T_{oF\_AP\_STA}$, is determined based on the FTM frame exchange itself. The AP 102 can perform similar TDoA and ToF computations for the sensor S2 and other sensors, if any, to determine absolute distances between the STA 104 and each of the sensors S1, S2.

The timing module 212 of the AP 102 may also directly compute ToF between the sensor S1 and the STA 104 as follows:

$$T_{oF\_S1\_STA}=[t_2(S1)\cdot(1-\text{ppm}_{AP\_S1})-t_1(STA)\cdot(1-\text{ppm}_{AP\_STA})]-[t_4(S1)\cdot(1-\text{ppm}_{AP\_S1})-t_3(AP)-T_{AP\_S1}]$$

where the timestamps t2(S1), t1(STA), and t4(S1) are adjusted to the clock of the AP 102 using the respective frequency offsets estimated by the offset estimating module 222, assuming that the initial clock count $d_{AP\_STA}$ is zero.

The STA 104 and the AP 102, however, may have different initial clock count, $d_{AP\_STA}$, before the FTM frame exchange, and may need to perform another frame exchange (e.g., the synchronization exchange set forth in IEEE 802.11v) to synchronize the clocks between the STA 104 and the AP 102 to remove the initial clock count difference so that $d_{AP\_STA}=0$. This can be achieved with the estimated frequency offset between the STA 104 and the AP 102 determined from the FTM frame exchange as follows:

$$t_1(STA)\cdot(1-\text{ppm}_{STA\_AP})=t_{1\_STA}(AP)$$

The AP 102 can similarly determine $T_{oF\_S2\_STA}$. The sensors S1, S2 and the AP 102 may not need any clock sync-up because the above ToF equations remove any initial clock count difference between the sensors S1, S2 and the AP 102.

If the sensor S1 and the AP 102 also conduct clock sync-up, so that $d_{AP\_S1}=0$, then the ToF may be directly determined by the following equation:

$$T_{oF\_S1\_STA}=[t_2(S1)\cdot(1-\text{ppm}_{AP\_S1})-t_1(STA)\cdot(1-\text{ppm}_{AP\_STA})]$$

The AP 102 can similarly determine $T_{oF\_S2\_STA}$.

FIGS. 14-26 show three methods for determining location of a network device (e.g., a client station) according to the present disclosure. In each method, an access point communicates with a client station whose location is to be determined and also with a plurality of sensors (network devices configured to assist the access point in determining the location of the client station) that provide feedback to the access point or to the client station by snooping the communication between the access point and client station. The access point and the sensors are located at fixed distances from each other and at fixed locations. The access point knows the fixed distances and the fixed locations of the sensors relative to the access point. The access point and the sensors operate in the same frequency channel during predetermined time slots in which the access point communicates with the client station to determine the location of the client station. The access point and the sensors may have multiple antennas, but use a single antenna when communicating during the predetermined time slots. Accordingly, the methods include steps for selecting the predetermined frequency channel in which to operate during the predetermined time slots and for selecting an antenna for communication during the predetermined time slots. Further, the methods include steps for providing the information regarding the predetermined frequency channel and the predetermined time slots to other devices including the sensors.

Figure 14:
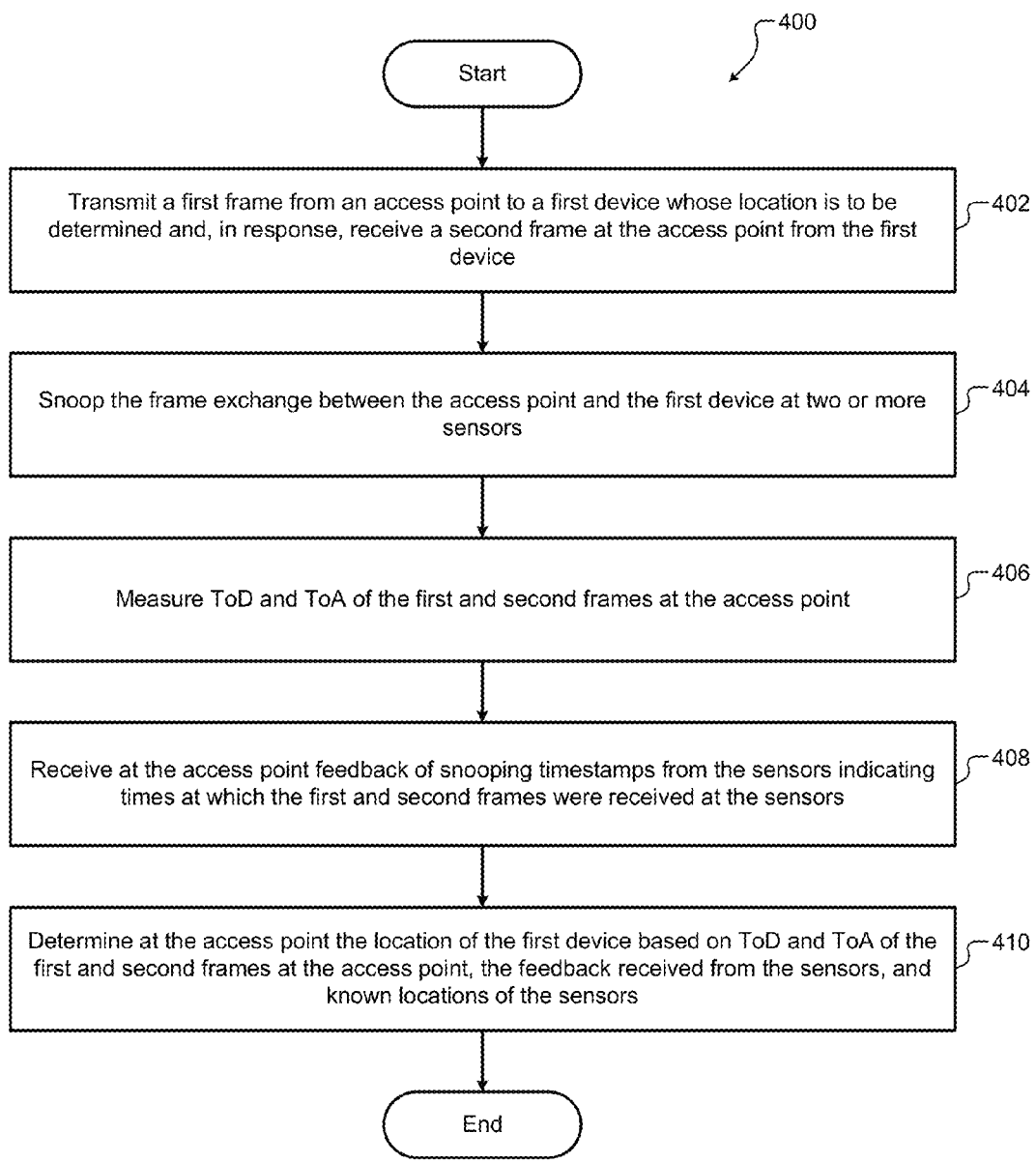
FIGS. 14-19 are flowcharts of a first method for determining a location of a network device at an access point using a single frame exchange between the network device and the access point.

FIG. 14 shows a first method 400 executed by an access point for determining a location of a first device according to the present disclosure. In the first method 400, the access point determines the location of the first device by performing a single frame exchange with the first device and by using feedback received from two or more sensors. The frames exchanged between the access point and the first device can be decoded by a legacy device (i.e., the first device can be a legacy device) that does not implement the FTM procedure defined in IEEE 802.11v. The frames exchanged between the access point and the first device can be decoded by the sensors although the frames are addressed to the first device and not to the sensors. At 402, the access point transmits a first frame to the first device and, in response, receives a second frame from the first device. At 404, the sensors snoop the frame exchange between the access point in the first device. At 406, the access point measures the ToD and ToA of the first and second frames at the access point. At 408, the access point receives feedback of snooping timestamps from the sensors indicating times at which the first and second frames were received at the sensors. At 410, the access point determines the location of the first device based on the ToD and ToA of the first and second frames at the access point, the feedback received from the sensors, and the known locations of the sensors.

Figure 15:
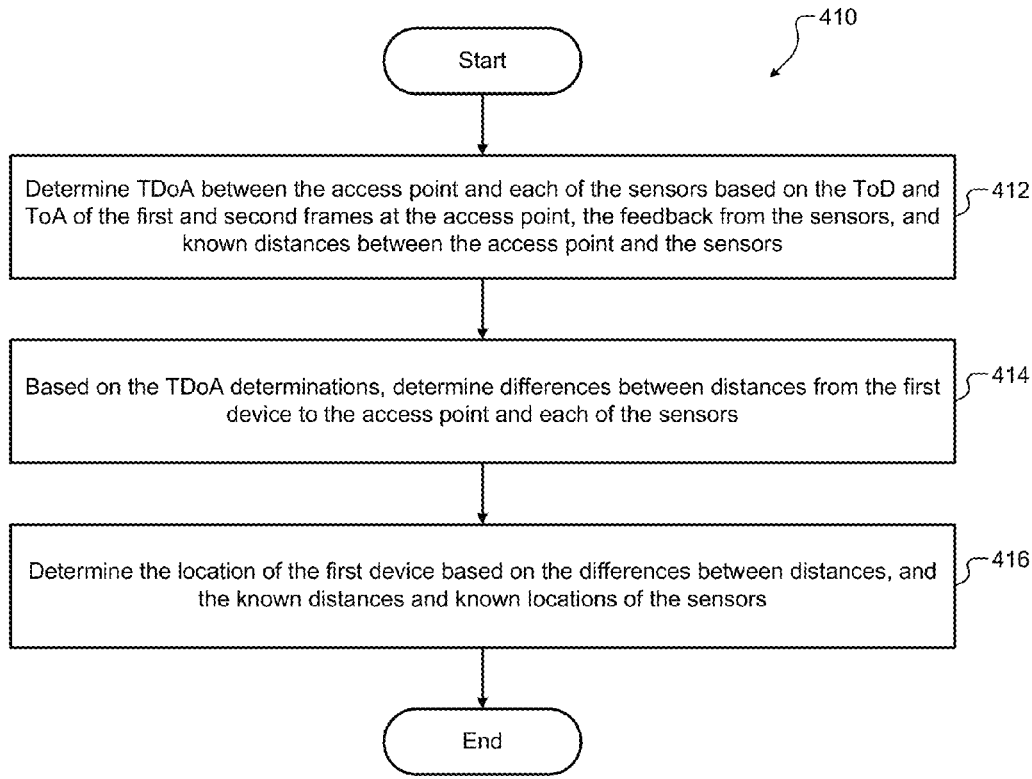

FIG. 15 shows element 410 in further detail. At 412, the access point determines TDoA between the access point and each of the sensors based on the ToD and ToA of the first and second frames at the access point, the feedback from the sensors, and the known distances between the access point and the sensors. At 414, based on the TDoA determinations, the access point determines differences between the distances from the first device to the access point and each of the sensors. At 416, the access point determines the location of the first device based on the differences between distances, and the known distances and known locations of the sensors.

Figure 16:
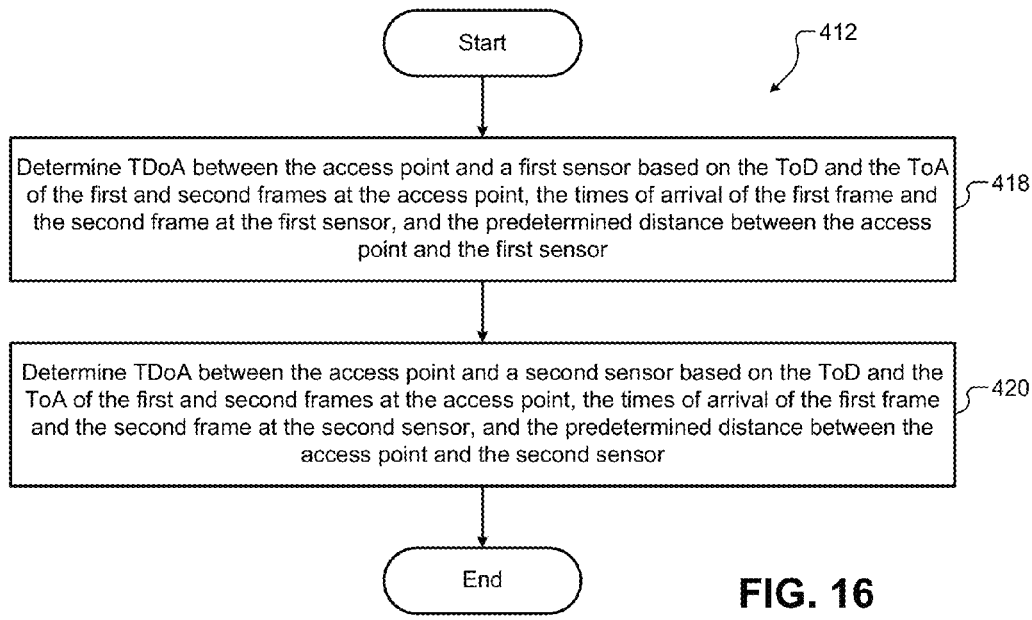

FIG. 16 shows element 412 in further detail. At 418, the access point determines TDoA between the access point and a first sensor based on the ToD and ToA of the first and second frames at the access point, the times of arrival of the first frame and the second frame at the first sensor as indicated by the feedback from the first sensor, and the predetermined distance between the access point and the first sensor. At 420, the access point determines TDoA between the access point and a second sensor based on the ToD and ToA of the first and second frames at the access point, the times of arrival of the first frame and the second frame at the second sensor as indicated by the feedback from the second sensor, and the predetermined distance between the access point and the second sensor.

Figure 17:
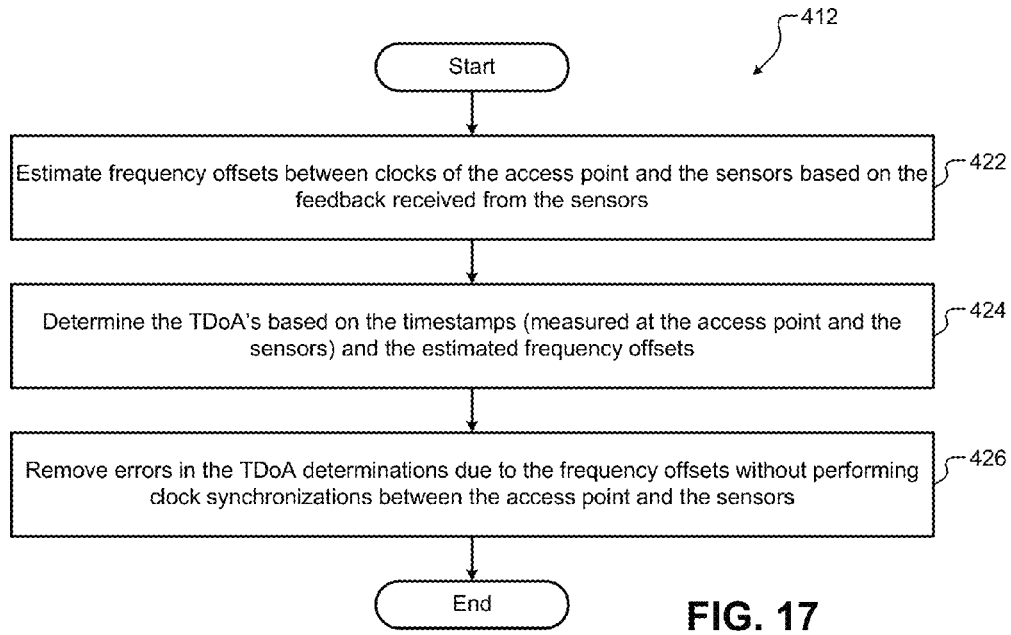

FIG. 17 shows element 412 in further detail. At 422, the access point estimates frequency offsets between clocks of the access point and the sensors based on the feedback received from the sensors. At 424, the access point determines the TDoA's based on the timestamps measured at the access point and at the sensors, and the estimated frequency offsets. At 426, the access point removes errors in the TDoA determinations due to the frequency offsets without performing clock synchronizations between the access point and the sensors. These values of the TDoA determinations are then used in determining the location of the first device.

Figure 18:
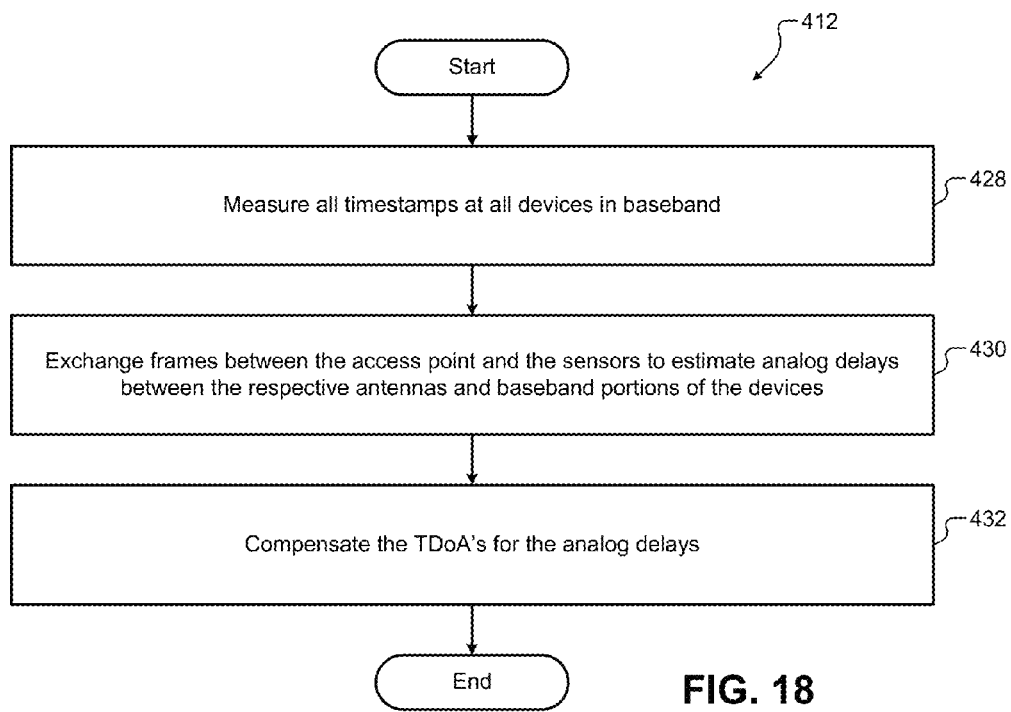

FIG. 18 shows element 412 in further detail. At 428, the access point, the sensors, and the first device measure respective timestamps in baseband. At 430, the access point exchanges frames with the sensors to estimate analog delays between the respective antennas and baseband portions of the devices (i.e., the access point and the sensors). At 432, the access point compensates the TDoA's for the analog delays. These values of the TDoA's are then used in determining the location of the first device.

Figure 19:
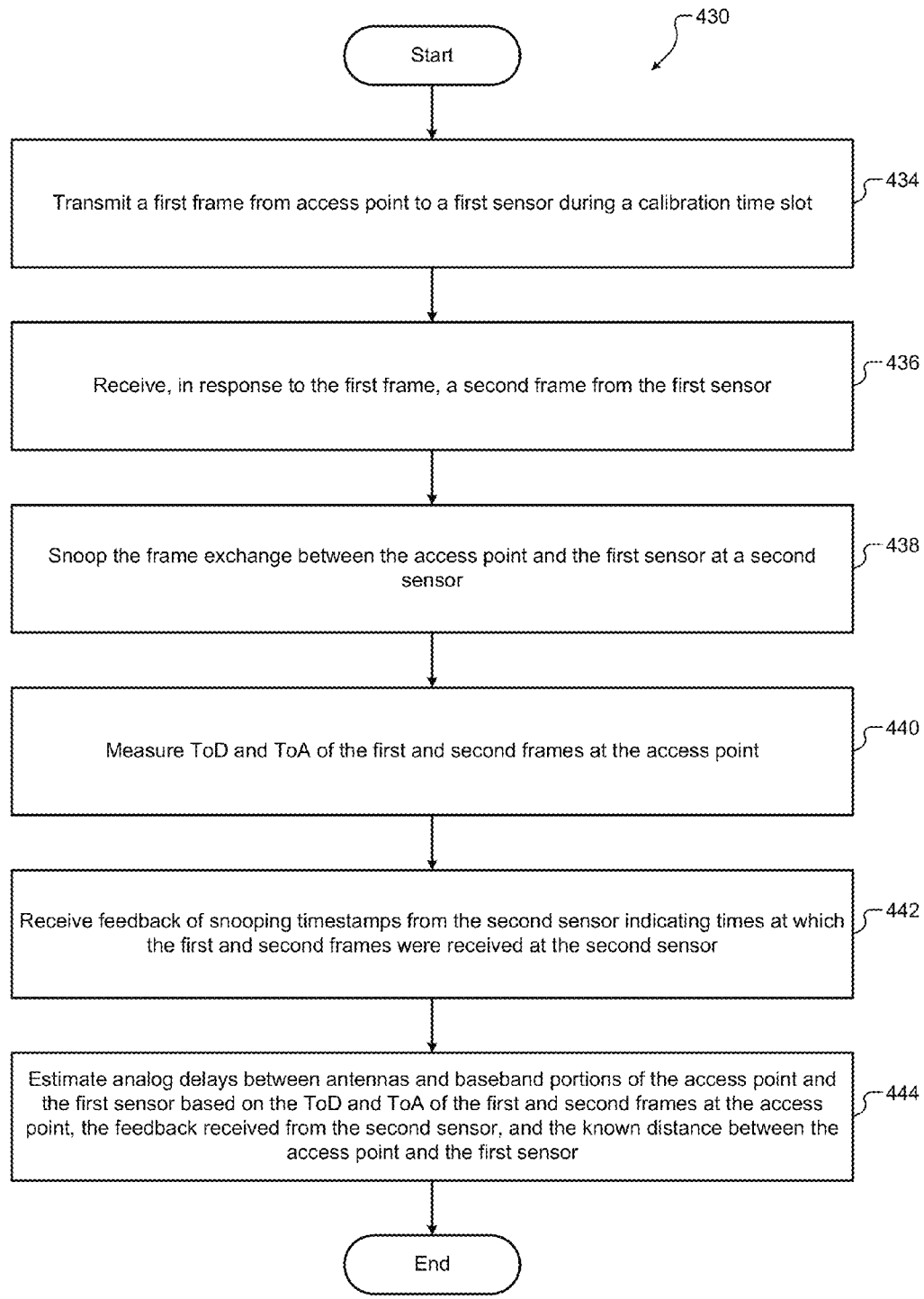

FIG. 19 shows element 430 in further detail. At 434, the access point transmits a first frame to the first sensor during a calibration time slot. At 436 the access point receives, in response to the first frame, a second frame from the first sensor. At 438, a second sensor snoops the frame exchange between the access point and the first sensor. At 440, the access point measures ToD and ToA of the first and second frames at the access point. At 442, the access point receives feedback of snooping timestamps from the second sensor indicating times at which the first and second frames are received at the second sensor. At 444, the access point estimates analog delays between the antennas and the baseband portions of the access point and the first sensor based on the ToD and ToA of the first and second frames at the access point, the feedback received from the second sensor, and the known distance between the access point in the first sensor. The access point repeats the procedure (elements 434-444) with the second sensor while the first sensor snoops the frame exchange between the access point and the second sensor and provides feedback to the access point.

In another embodiment, the first method 400 uses FTM frames, but performs a single FTM frame exchange between the access point and the first device. The sensors send the feedback via frames having FTM format that is modified to include the snooping timestamps.

Figure 20:
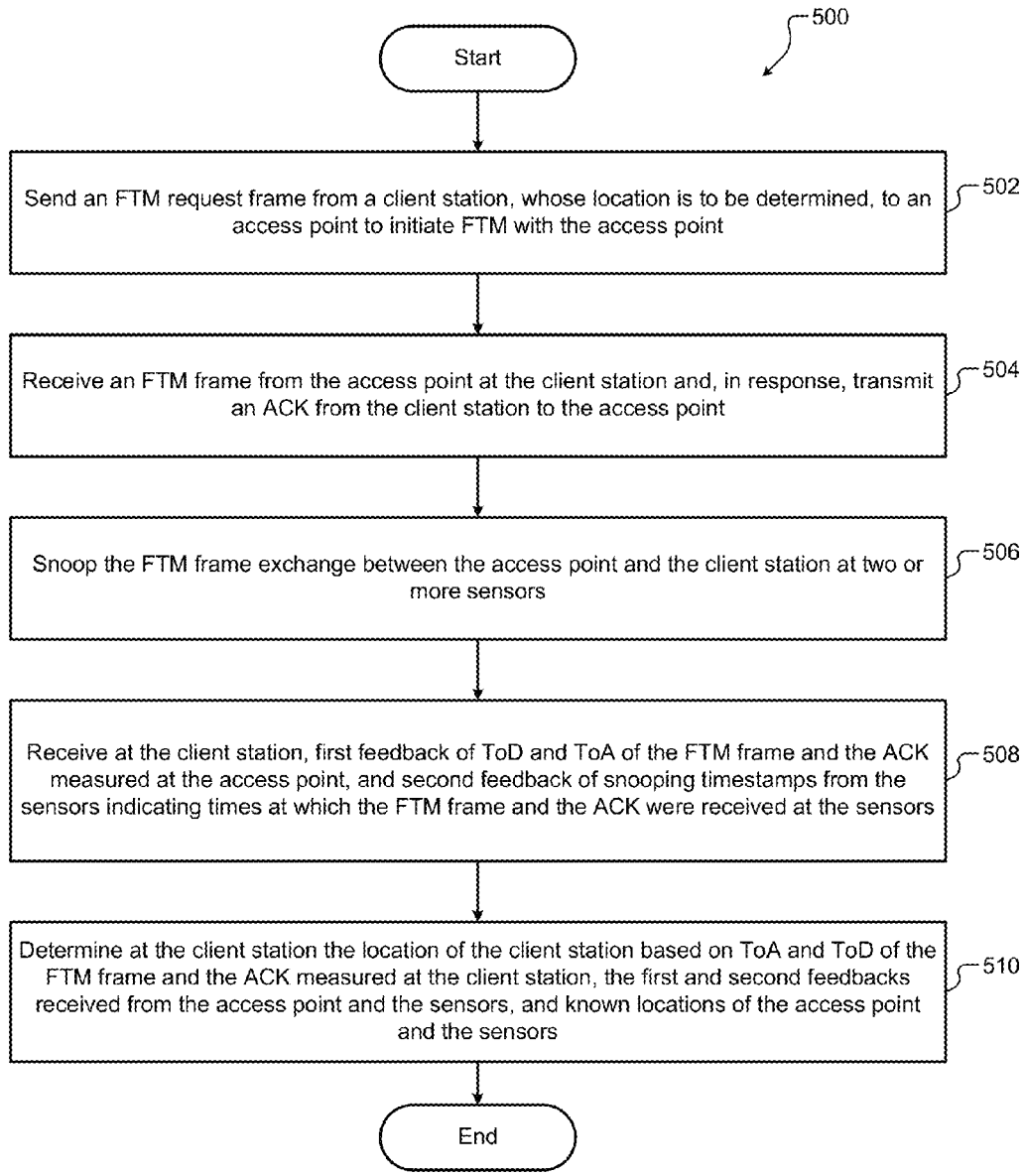
FIGS. 20-22 are flowcharts of a second method for determining a location of a network device at the network device using a single frame exchange between the network device and an access point.

FIG. 20 shows a second method 500 executed by a client station for determining a location of the client station according to the present disclosure. In the second method 500, the client station determines its location by performing a single FTM frame exchange with an access point and by using feedback received from two or more sensors. At 502, the client station sends an FTM request to an access point to initiate the FTM with the access point. At 404, the client station receives an FTM frame from the access point and, in response transmits an ACK to the access point. At 406, two or more sensors snoop the FTM frame exchange between the access point and the client station. At 408, the client station receives a first feedback of ToD and ToA of the FTM frame and the ACK measured at the access point, and a second feedback of snooping timestamps from the sensors indicating times at which the FTM frame and the ACK were received at the sensors. The sensors send the feedback via frames having FTM format that is modified to include the snooping timestamps. At 410, the client station determines its location based on the ToA and ToD of the FTM frame and the ACK measured at the client station, the first and second feedback's received from the access point and the sensors, and the known locations of the access point and the sensors. The client station receives data including the known distances between the access point and the sensors, and the known locations of the access point and the sensors from the access point via the FTM frame exchange and from the sensors via the feedback frames.

Figure 21:
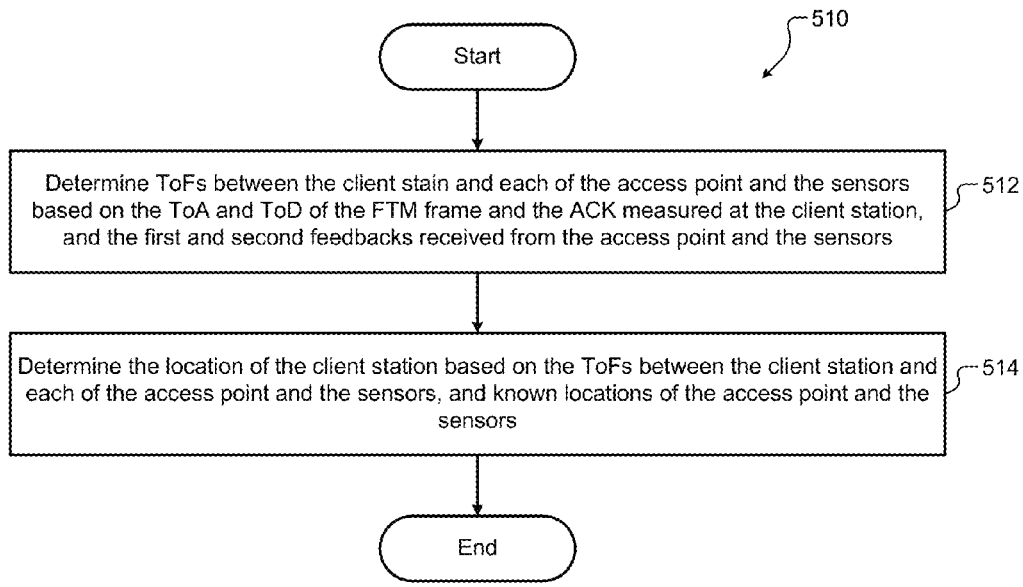

FIG. 21 shows element 510 in further detail. At 512, the client station determines times of flight between the client station and each of the access point and the sensors based on the ToA and ToD of the FTM frame and the ACK measured at the client station, and the first and second feedback's received from the access point and the sensors. At 514, the client station determines its location based on the times of flight between the client station and each of the access point and the sensors, and the known locations of the access point and the sensors.

Figure 22:
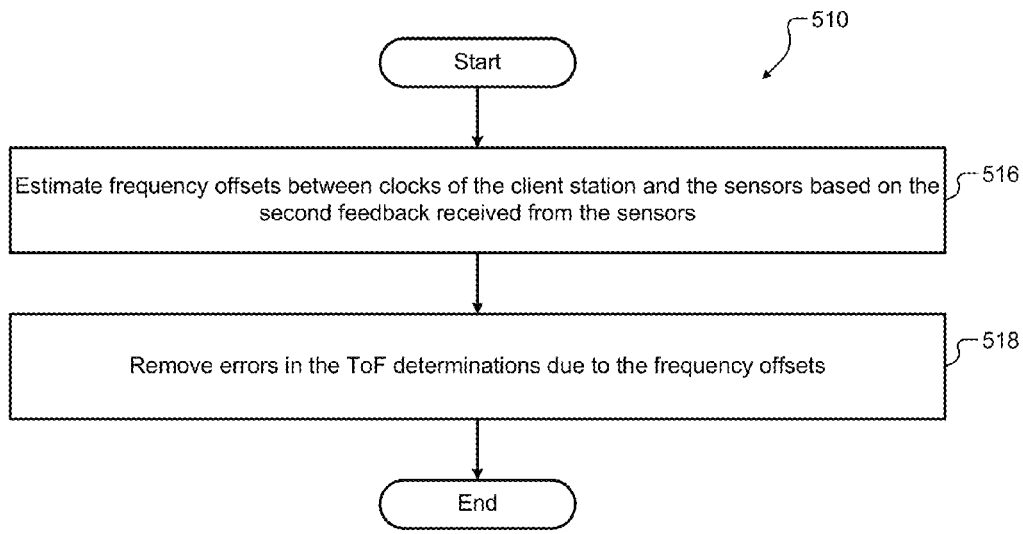

FIG. 22 shows element 510 in further detail. At 516, the client station estimates frequency offsets between clocks of the client station and the sensors based on the second feedback received from the sensors. At 518, the client station removes errors due to the frequency offsets from the ToF determinations. These values of the ToF determinations are then used in determining the location of the client station.

Figure 23:
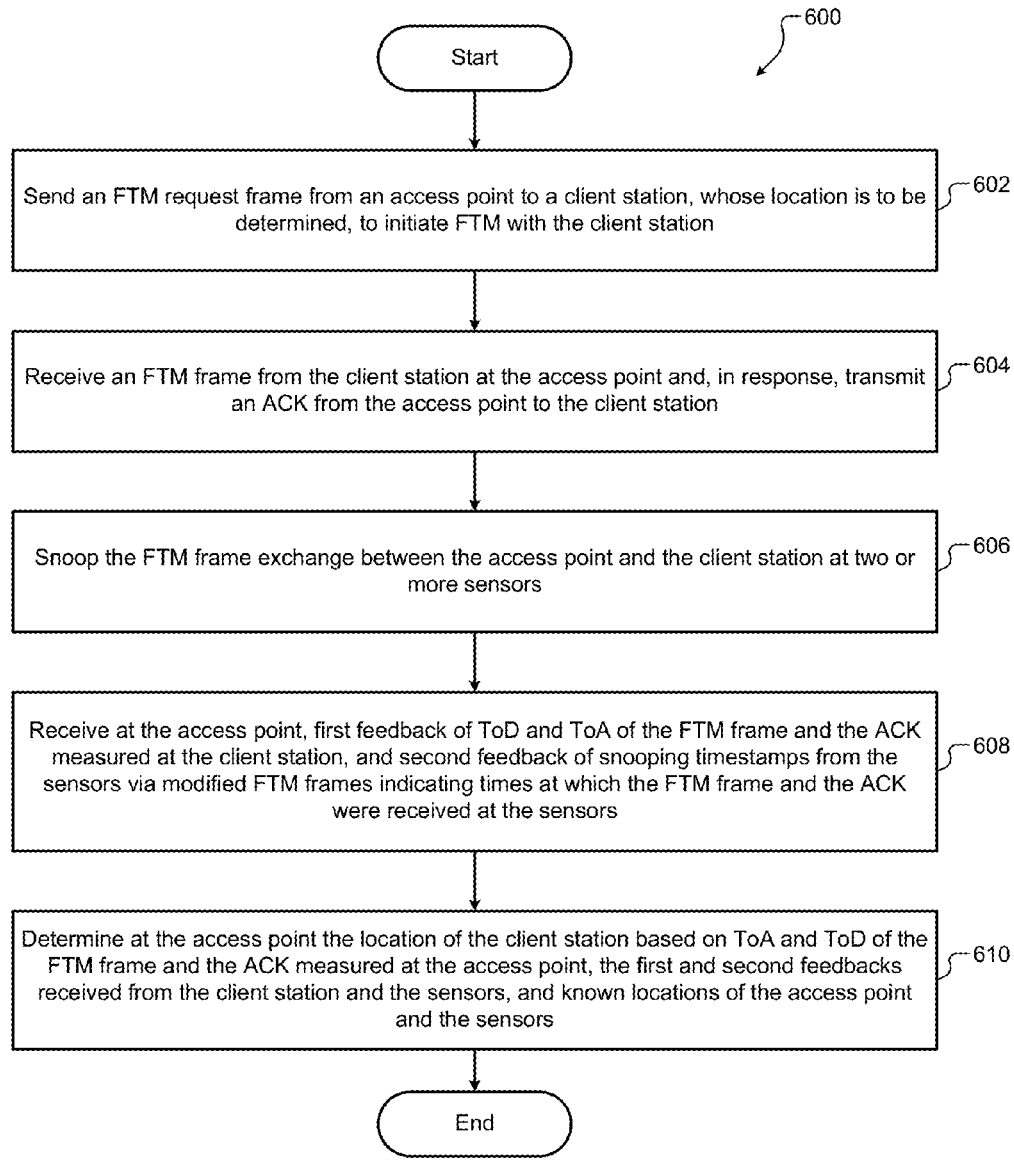
FIGS. 23-26 are flowcharts of a third method for determining a location of a network device at an access point using a single frame exchange between the network device and the access point.

FIG. 23 shows a third method 600 executed by an access point for determining a location of a client station according to the present disclosure. In the third method 600, the access point determines the location of the client station by performing a single frame exchange with the client station and by using feedback received from two or more sensors. At 602, the access point sends an FTM request to the client station to initiate FTM with the client station. At 604, the access point receives an FTM frame from the client station and, in response, transmits an ACK to the client station. At 606, the sensors snoop the FTM exchange between the access point and the client station. At 608, the access point receives a first feedback of ToD and ToA of the FTM frame and the ACK measured at the client station, and a second feedback of snooping timestamps from the sensors via modified FTM frames indicating times at which the FTM frame and the ACK were received at the sensors. At 610, the access point determines the location of the client station based on the ToA and ToD of the FTM frame and the ACK measured at the access point, the first and second feedbacks received from the client station and the sensors, and the known locations of the access point and the sensors.

Figure 24:
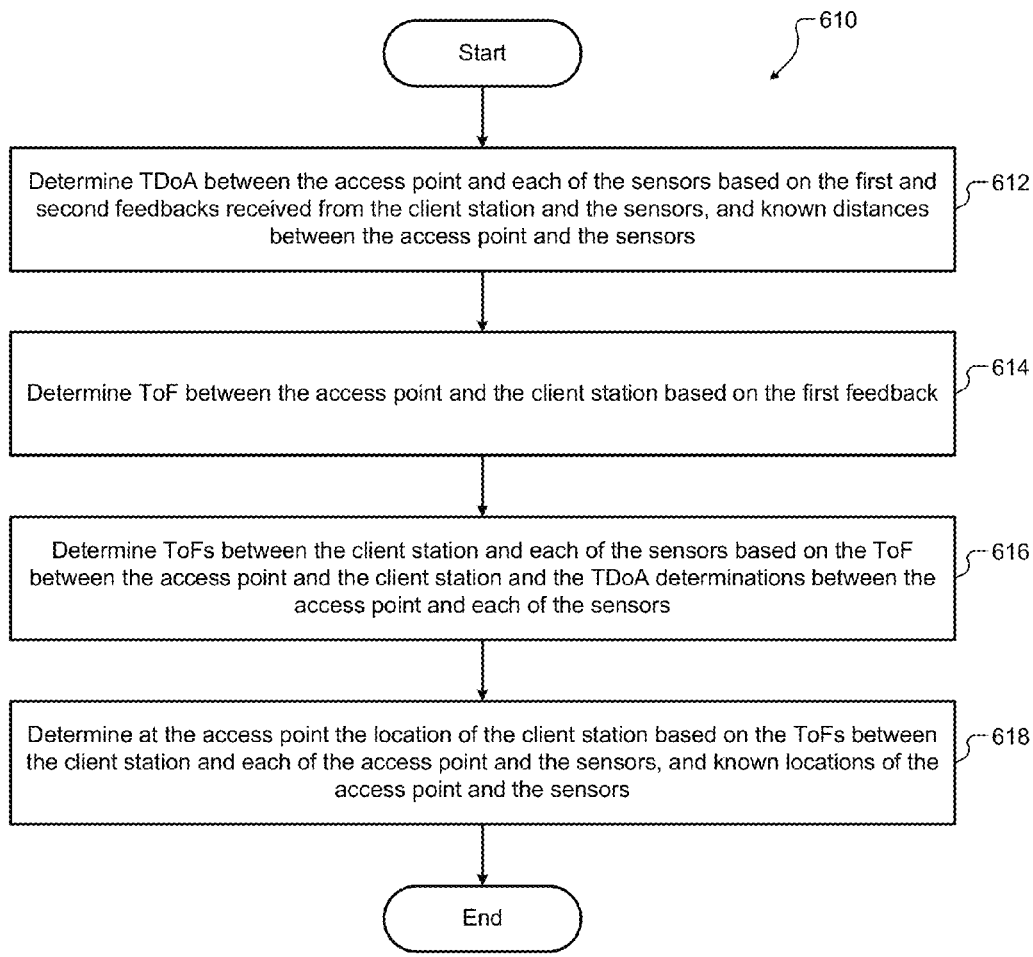

FIG. 24 shows element 610 in further detail. At 612, the access point determines TDoA's between the access point and the sensors based on the first and second feedbacks received from the client station and the sensors. At 614, the access point determines ToF between the access point and the client station based on the first feedback. At 616, the access point determines the times of flight between the client station and each of the sensors based on the ToF between the access point and the client station and the TDoA's between the access point and the sensors. At 618, the access point determines the location of the client station based on the times of flight between the client station and each of the access point and the sensors, and the known locations of the access point and the sensors.

Figure 25:
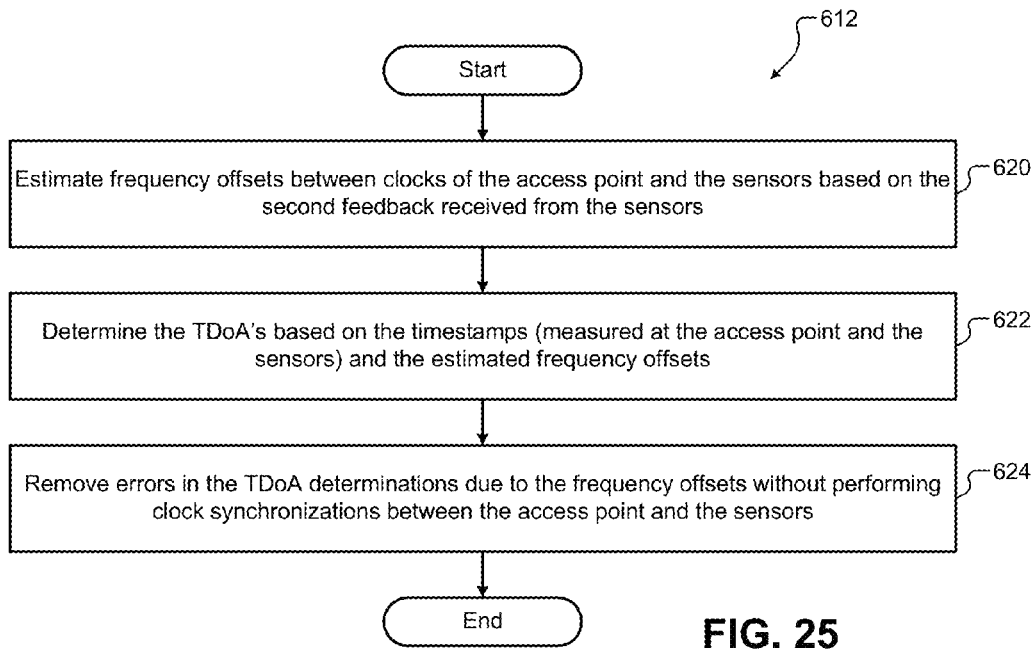

FIG. 25 shows element 612 in further detail. At 620, the access point estimates frequency offsets between clocks of the access point and the sensors based on the second feedback received from the sensors. At 622, the access point determines the TDoA's based on the timestamps measured at the access point and the sensors and the estimated frequency offsets. At 624, the access point removes errors in the TDoA determinations due to the frequency offsets without performing clock synchronizations between the access point and the sensors. These values of the TDoA's are then used in determining the location of the client station.

Figure 26:
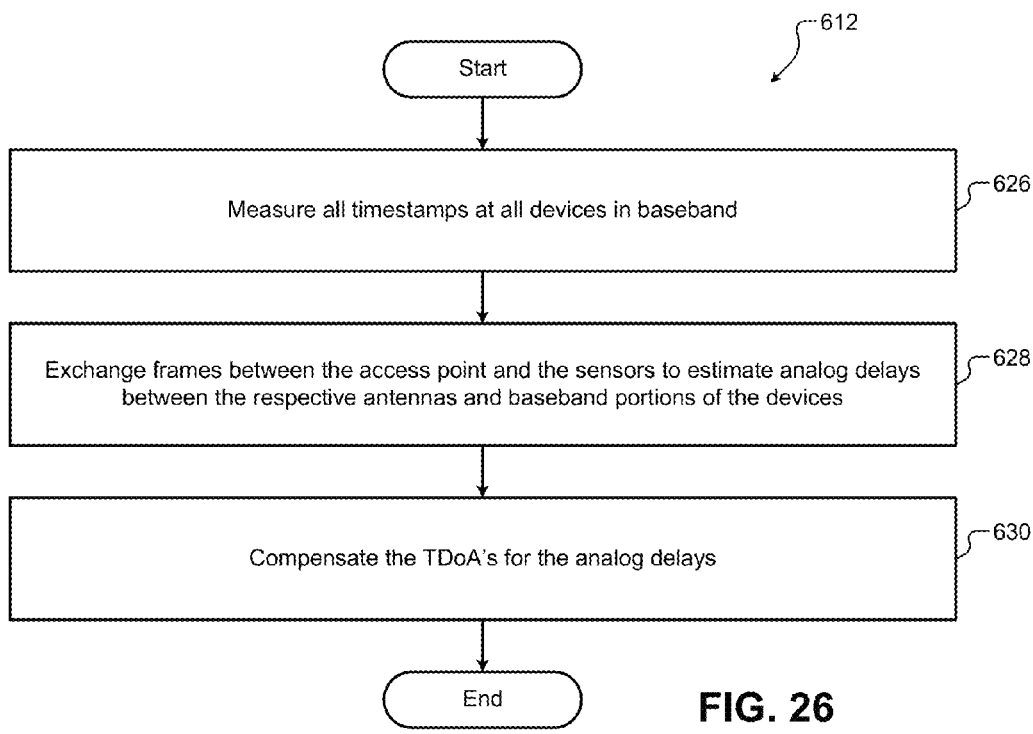

FIG. 26 shows element 612 in further detail. At 626, the access point, the sensors, and the client station measure respective timestamps in baseband. At 628, the access point exchanges frames with the sensors to estimate analog delays between the respective antennas and baseband portions of the devices (i.e., the access point and the sensors). At 630, the access point compensates the TDoA's for the analog delays. These values of the TDoA determinations are then used in determining the location of the client station.

The wireless communications described in the present disclosure can be conducted in full or partial compliance with one or more of IEEE standard 802.11-2012, IEEE standard 802.16-2009, IEEE standard 802.20-2008, and IEEE standard 802.11v. In various implementations, IEEE 802.11-2012 may be supplemented by draft IEEE standard 802.11ac, draft IEEE standard 802.11ad, and/or draft IEEE standard 802.11ah; and the IEEE standard 802.11v may be supplemented by draft IEEE standard 802.11mc.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium include nonvolatile memory circuits (such as a flash memory circuit or a mask read-only memory circuit), volatile memory circuits (such as a static random access memory circuit and a dynamic random access memory circuit), and secondary storage, such as magnetic storage (such as magnetic tape or hard disk drive) and optical storage.

The apparatuses and methods described in this application may be partially or fully implemented by a special purpose computer created by configuring a general purpose computer to execute one or more particular functions embodied in computer programs. The computer programs include processor-executable instructions that are stored on at least one non-transitory, tangible computer-readable medium. The computer programs may also include or rely on stored data. The computer programs may include a basic input/output system (BIOS) that interacts with hardware of the special purpose computer, device drivers that interact with particular devices of the special purpose computer, one or more operating systems, user applications, background services and applications, etc.

The computer programs may include: (i) assembly code; (ii) object code generated from source code by a compiler; (iii) source code for execution by an interpreter; (iv) source code for compilation and execution by a just-in-time compiler, (v) descriptive text for parsing, such as HTML (hypertext markup language) or XML (extensible markup language), etc. As examples only, source code may be written in C, C++, C#, Objective-C, Haskell, Go, SQL, Lisp, Java®, ASP, Perl, Javascript®, HTML5, Ada, ASP (active server pages), Perl, Scala, Erlang, Ruby, Flash®, Visual Basic®, Lua, or Python®.

None of the elements recited in the claims is intended to be a means-plus-function element within the meaning of 35 U.S.C. §112(f) unless an element is expressly recited using the phrase "means for", or in the case of a method claim using the phrases "operation for" or "step for".

What is claimed is:

1. A system comprising:
   a receiver configured to receive, at a first access point of a wireless network, a first frame from a client station, wherein the first frame includes a fine timing measurement frame, wherein the first frame is also received by a second device and a third device in the wireless network, and wherein the first access point, the second device, and the third device (i) are separated from each other by predetermined distances and (ii) are located at predetermined locations in the wireless network;
   a transmitter configured to transmit, from the first access point to the client station, a second frame including an acknowledgement to the first frame, wherein the second frame is also received by the second device and the third device;
   a feedback module configured to receive, at the first access point,
      a first feedback from the client station including (i) time of departure of the first frame from the client station, and (ii) time of arrival of the second frame at the client station; and
      a second feedback from the second device and the third device including times of arrival of the first frame and the second frame at the second device and the third device; and
   a location determining module configured to determine, at the first access point, a location of the client station based on (i) times of arrival and departure of the first frame and the second frame at the first access point; (ii) the first feedback; (iii) the second feedback; and (iv) the predetermined locations of the first access point, the second device, and the third device.

2. The system of claim 1, further comprising:
   a time difference determining module configured to determine, at the first access point, based on the first feedback, the second feedback, and the predetermined distances, (i) a first time difference of arrival between times of arrival of the first frame at the first access point and at the second device, and (ii) a second time difference of arrival between times of arrival of the first frame at the first access point and at the third device; and
   a timing module configured to
      determine time of flight between the first access point and the client station based on the first feedback; and
      determine times of flight between the client station and each of the second device and the third device based on (i) the time of flight between the first access point and the client station, (ii) the first time difference of arrival between times of arrival of the first frame at the first access point and at the second device, and (ii) the second time difference of arrival between times of arrival of the first frame at the first access point and at the third device.

3. The system of claim 2, wherein the location determining module is configured to determine, at the first access point, the location of the client station based on:
the times of flight between the client station and each of the first access point, the second device, and the third device; and
the predetermined locations of the first access point, the second device, and the third device.

4. The system of claim 3, further comprising:
an offset estimating module configured to estimate a frequency offset between clocks of the first access point, the second device, and the third device based on the second feedback,
wherein the time difference determining module is configured to
determine the first time difference of arrival and the second time difference of arrival based on the frequency offsets; and
remove errors due to the frequency offsets from the first time difference of arrival and the second time difference of arrival without performing clock synchronizations between the first access point, the second device, and the third device.

5. The system of claim 2, wherein:
the first access point, the second device, and the third device are configured to communicate on a predetermined frequency channel during a predetermined time slot; and
the first access point is configured to transmit the first frame and receive the second frame on the predetermined frequency channel during the predetermined time slot.

6. The system of claim 2, further comprising:
the second device, wherein the second device includes
a first station associated with the first access point, wherein the first station is configured to (i) assist the first access point in determining the location of the client station, and (ii) communicate no other data; or
a second access point configured to communicate on a predetermined frequency channel of the wireless network during a predetermined time slot used by the first access point to determine the location of the client station; and
the third device, wherein the third device includes
a second station associated with the first access point, wherein the second station is configured to (i) assist the first access point in determining the location of the client station, and (ii) communicate no other data; or
a third access point configured to communicate on the predetermined frequency channel of the wireless network during the predetermined time slot used by the first access point to determine the location of the client station.

7. The system of claim 2, wherein the first access point, the second device, and the third device include one or more antennas and are configured to communicate via a single antenna on a predetermined frequency channel during a predetermined time slot used by the first access point to determine the location of the client station.

8. The system of claim 2, wherein the second device and the third device are configured to decode the first frame addressed to the client station and not addressed to the second device and the third device.

9. The system of claim 2, wherein the second device and the third device are configured to listen to the first frame received by the first access point and the second frame transmitted by the first access point on a predetermined frequency channel during a predetermined time slot used by the first access point to determine the location of the client station.

10. The system of claim 2, wherein:
the timing module is configured to measure the times of arrival and departure of the first frame and the second frame in baseband, wherein the times of arrival and departure include delays between a baseband portion and an antenna of the first access point; and
the feedback module is configured to receive the first feedback and the second feedback including time measurements performed at the client station, the second device, and the third device in baseband; wherein the time measurements include delays between baseband portions and antennas of the client station, the second device, and the third device.

11. The system of claim 10, further comprising:
a delay estimating module configured to generate, by exchanging frames between the first access point and each of the second device and the third device, estimates of (i) the delays between the baseband portion and the antenna of the first access point; and (ii) the delays between baseband portions and antennas of the client station, the second device, and the third device; and
a compensating module configured to compensate, based on the estimates, (i) the first time difference of arrival between times of arrival of the first frame at the first access point and at the second device, and (ii) the second time difference of arrival between times of arrival of the first frame at the first access point and at the third device.

12. A method comprising:
receiving, at a first access point of a wireless network, a first frame from a client station, wherein the first frame includes a fine timing measurement frame, wherein the first frame is also received by a second device and a third device in the wireless network, and wherein the first access point, the second device, and the third device (i) are separated from each other by predetermined distances and (ii) are located at predetermined locations in the wireless network;
transmitting, from the first access point to the client station, a second frame including an acknowledgement to the first frame, wherein the second frame is also received by the second device and the third device;
receiving, at the first access point,
a first feedback from the client station including (i) time of departure of the first frame from the client station, and (ii) time of arrival of the second frame at the client station; and
a second feedback from the second device and the third device including times of arrival of the first frame and the second frame at the second device and the third device; and
determining, at the first access point, a location of the client station based on (i) times of arrival and departure of the first frame and the second frame at the first access point; (ii) the first feedback; (iii) the second feedback; and (iv) the predetermined locations of the first access point, the second device, and the third device.

13. The method of claim 12, further comprising:
determining, at the first access point, based on the first feedback, the second feedback, and the predetermined distances, (i) a first time difference of arrival between times of arrival of the first frame at the first access point and at the second device, and (ii) a second time difference of arrival between times of arrival of the first frame at the first access point and at the third device;

determining time of flight between the first access point and the client station based on the first feedback; and determining times of flight between the client station and each of the second device and the third device based on (i) the time of flight between the first access point and the client station, (ii) the first time difference of arrival between times of arrival of the first frame at the first access point and at the second device, and (ii) the second time difference of arrival between times of arrival of the first frame at the first access point and at the third device.

14. The method of claim 13, further comprising determining, at the first access point, the location of the client station based on:

the times of flight between the client station and each of the first access point, the second device, and the third device; and the predetermined locations of the first access point, the second device, and the third device.

15. The method of claim 14, further comprising:

estimating a frequency offset between clocks of the first access point, the second device, and the third device based on the second feedback;

determining the first time difference of arrival and the second time difference of arrival based on the frequency offsets; and removing errors due to the frequency offsets from the first time difference of arrival and the second time difference of arrival without performing clock synchronizations between the first access point, the second device, and the third device.

16. The method of claim 13, further comprising:

communicating between the first access point, the second device, and the third device on a predetermined frequency channel during a predetermined time slot; and at the first access point, transmitting the first frame and receiving the second frame on the predetermined frequency channel during the predetermined time slot.

17. The method of claim 13, wherein the second device includes a first station or a second access point, and wherein the third device includes a second station or a third access point, the method further comprising:

assisting the first access point in determining the location of the client station using the second device and the third device;

in response to the second device and the third device respectively including the second access point and the third access point, communicating between the first access point and each of the second access point and the third access point on a predetermined frequency channel of the wireless network during a predetermined time slot used by the first access point to determine the location of the client station; and in response to the second device and the third device respectively including the first station and the second station, (i) associating the first station and the second station with the first access point, and (ii) communicating no other data using the first station and the second station.

18. The method of claim 13, further comprising communicating, via a single antenna of each of the first access point, the second device, and the third device, on a predetermined frequency channel during a predetermined time slot used by the first access point to determine the location of the client station.

19. The method of claim 13, further comprising decoding, at the second device and the third device, the first frame addressed to the client station and not addressed to the second device and the third device.

20. The method of claim 13, further comprising listening, at the second device and the third device, to the first frame transmitted by the first access point and the second frame received by the first access point on a predetermined frequency channel during a predetermined time slot used by the first access point to determine the location of the client station.

21. The method of claim 13, further comprising:

measuring the times of arrival and departure of the first frame and the second frame in baseband, wherein the times of arrival and departure include delays between a baseband portion and an antenna of the first access point; and receiving the first feedback and the second feedback including time measurements performed at the client station, the second device, and the third device in baseband; wherein the time measurements include delays between baseband portions and antennas of the client station, the second device, and the third device.

22. The method of claim 21, further comprising:

generating, by exchanging frames between the first access point and each of the second device and the third device, estimates of (i) the delays between the baseband portion and the antenna of the first access point; and (ii) the delays between baseband portions and antennas of the client station, the second device, and the third device; and compensating, based on the estimates, (i) the first time difference of arrival between times of arrival of the first frame at the first access point and at the second device, and (ii) the second time difference of arrival between times of arrival of the first frame at the first access point and at the third device.

* * * * *